US006615250B1

(12) United States Patent
Brunet et al.

(10) Patent No.: US 6,615,250 B1
(45) Date of Patent: Sep. 2, 2003

(54) AGENT FOR COMMUNICATION BETWEEN A MANAGER AND AT LEAST ONE RESOURCE OF A DATA PROCESSING SYSTEM

(75) Inventors: Jean Brunet, Betton (FR); Gérald Sedrati, Paris (FR)

(73) Assignee: Thomson Licensing S.A., Boulogne Cedex (FR)

( * ) Notice: Subject to any disclaimer, the term of this patent is extended or adjusted under 35 U.S.C. 154(b) by 0 days.

(21) Appl. No.: 09/335,773

(22) Filed: Jun. 18, 1999

(30) Foreign Application Priority Data

Jun. 30, 1998 (FR) .............................. 98 08297

(51) Int. Cl.7 ................................................ G06F 11/00
(52) U.S. Cl. ........................... 709/218; 709/216; 714/13
(58) Field of Search .................. 709/203, 216, 709/217, 218, 222, 223, 224, 232; 714/13

(56) References Cited

U.S. PATENT DOCUMENTS

| 5,295,244 | A |   | 3/1994  | Dev et al.    |         |
|-----------|---|---|---------|---------------|---------|
| 5,491,796 | A |   | 2/1996  | Wanderer et al. |       |
| 6,044,205 | A | * | 3/2000  | Reed et al.   | 709/201 |
| 6,134,583 | A | * | 10/2000 | Herriot       | 709/217 |
| 6,272,537 | B1 | * | 8/2001 | Kekic         | 709/223 |
| 6,363,497 | B1 | * | 3/2002 | Chrabaszcz    | 714/13  |

FOREIGN PATENT DOCUMENTS

EP          0 621 705 A2      10/1994

OTHER PUBLICATIONS

Speaker, LA: "A Toolkit for Developing TMN Manager/Agent Applications" Hewlett–Packard Journal vol. 47, No. 5, Oct. 1996 pp. 52–61, XPOOO631666.
Feridun, M et al. "Implementing OSI Agent/Managers for TMN", IEEE Communications Magazine, vol. 34 No. 9, Sep. 1996, pp. 62–67, XP000627236.

* cited by examiner

Primary Examiner—Ario Etienne
Assistant Examiner—Khanh Quang Dinh
(74) Attorney, Agent, or Firm—Joseph S. Tripoli; Ronald H. Kurdyla; Jeffrey M. Navon

(57) ABSTRACT

The agent for communication between a manager (20) and at least one resource (30) comprises a protocol core (111) created automatically from a formalized description of the resource (30), this core (111), once created, comprising in compiled form an interface (14) for communication with the manager (20) and a model (11) of the resource (30) comprising the values of the instances of the resource (30), these values being accessible by the administrator (20) through the communication interface (14).

21 Claims, 8 Drawing Sheets

AGENT FOR COMMUNICATION BETWEEN A MANAGER AND AT LEAST ONE RESOURCE OF A DATA PROCESSING SYSTEM

BACKGROUND OF THE INVENTION

The present invention relates to an agent for communication between a manager and at least one resource of a data processing system. The manager is also known as an administrative platform. The invention also relates to a library of tools for creating an agent. An agent of this type enables a manager of a data processing system to control, monitor and evaluate computing resources remotely. The invention also relates to a process for communicating between a manager and a resource using an agent that enables a manager of a data processing system to remotely control, monitor and evaluate computer resources.

DESCRIPTION OF RELATED ART

It is known in the prior art that a distributed system is constituted by computing resources, which may be mainframes, workstations, bridges, routers, printers, operating systems, applications, etc. In short, any entity of the data processing system is considered to be a resource.

To administrate or manage a distributed system is to manage all of its resources. An administrative platform (or manager), which must have as complete, accurate and detailed a view as possible of the resources it has to manage, is used for this purpose.

This view of a resource is made possible by a model of the resource in question. The modeling of a resource is based, in particular, on an approach and a structuring of objects organized into a tree of management information. The model of a resource is managed by an agent capable of instantiating these objects with the help of information from the resource or from the administrative platform.

Because of the specificity of each resource, each agent must be created individually for each of its resources, and must contain the expertise for communicating with the manager, also called known as the protocol core, and the expertise of the system to be managed.

The known methods for developing an agent of the prior art consist of a programmer's designing, in their entirety, the expertise for communicating with the manager and the expertise for communicating with the resource to be managed. In its development, the programmer is confronted with two types of problems, those linked to the protocol for communicating with the manager and those linked to the development of the expertise of the resource to be managed. Furthermore, these two types of expertise are not separated in the agent, resulting in problems in terms of performance, robustness, code quality, reliability, and development time for the agent, since the programmer is confronted with two problems at once and therefore, for each agent developed, the programmer must systematically develop the protocol core without being able to reuse it.

SUMMARY OF THE INVENTION

Hence, the first object of the present invention is to eliminate the drawbacks of the prior art by offering a simpler, faster agent, designed so as to be adaptable to different contexts and having great reliability.

This object is achieved by the fact that the agent for communication between a manager and at least one resource of a data processing system comprises a protocol core created automatically from a formalized description of the resource, this core, once created, comprising in compiled form a first interface for communicating with the manager and a model of the resource comprising the values of the instances of the resource, these values being accessible by the manager through the first communication interface.

According to another characteristic, the agent comprises, in a second interface, at least one method for accessing the resource for communicating with the protocol core and updating and/or reading at least one value of an instance of the model of the resource specific to the method, and for responding to requests from the core related to the updating of at least one instance value of the model of the resource.

According to another characteristic, the resource being modeled in the form of attributes, access to each attribute managed by the agent can be obtained in either a "direct" mode or a "signal" mode, defined in a configuration file <agt>.confget.

According to another characteristic, when the access method uses sockets interface primitives, the configuration file includes an identifier of the method that is associated with the instance.

According to another characteristic, the formalized description of the resource is in the form of an MIB (management information base).

According to another characteristic, the model of the resource comprises a sorted database constructed from the formalized description of the resource.

According to another characteristic, the protocol core includes a compiled file containing sorted data for the management of objects specific to its operation.

According to another characteristic, the communication between the manager and the protocol core takes place in accordance with the Simple Network Management Protocol (SNMP) ASN1 (Abstract Syntax Notation One), by means of verbs that allow the operations for reading an instance (get), for reading the next instance (get-next) and for modifying an instance (set).

According to another characteristic, when the manager sends, in the same request, an operation for a modification (SET) on a list of instances, the core transmits instance modification messages (SET) one by one to the methods corresponding to each instance, the last message for modifying the last instance being transmitted by a modification message (SETLAST) indicating that it is the last instance in the list; as long as the method has not received the last message from the core, the modifications of the instances are stored, and as soon as the last message is received by the method, if all the modifications of the instances are possible, they are all validated, whereas if not, they are all cancelled.

According to another characteristic, the communication between each access method and the core takes place through online TCP/IP (Transmission Control Protocol/Internet Protocol) communication software.

According to another characteristic, the communication between the protocol core and at least one method for accessing the resources in the "sockets" mode takes place through two TCP/IP connection processes that communicate through sockets executable primitives, making it possible to perform the operations for reading the value of an instance (readInstSock), for modifying an instance (writeInstSock), for reading the next instance (readNextSock), for writing a new instance, and for deleting an instance.

According to another characteristic, the communication between two methods (12) of access to the resource (30) in the "sockets" mode is established by calling a function (notifyMeth).

According to another characteristic, the communication between the protocol core and at least one method for accessing the resources in the "direct" mode" takes place through named pipes and executable primitives, making it possible to perform the operations for reading the value of an instance (readInstDirect), for modifying an instance (writeInstDirect), for reading the next instance (readNextDirect), for writing a new instance, and for deleting an instance.

According to another characteristic, the structure of each message related to an operation on an instance of the resource, and constructed by the protocol core of the agent to be sent to at least one method, comprises a field for identifying the instance, a field corresponding to the value of the instance, a code identifying the operation to be executed and a return code indicating whether the operation has been performed.

According to another characteristic, the manager and/or the method can create an instance in the model of the resource managed by the core, by means of a request sent to the core containing the verb (SET) for an instance modification on an instance that is no-existent in the model, the reception of this request by the core resulting in the creation of the instance.

According to another characteristic, the manager and/or the method can delete an instance in the model of the resource managed by the core by means of a request comprising the verb (SET) for modifying an instance, which assigns the name of the instance to be deleted to a predetermined, preexisting instance (gamdeleteObject) of the model of the resource, the reception of this request by the core resulting in the deletion of the instance.

According to another characteristic, the model of the resource included in the core is a database sorted in the lexicographical order of the protocol SNMP.

According to another characteristic, the model of the resource managed by the core is initialized by an instance file created by the user before the initialization of the core.

According to another characteristic, the successive modifications of at least one instance value of the model of the resource are stored in a backup file of predetermined maximum size.

According to another characteristic, a merge between the instance file and the backup file is performed before the initialization of the core, or when the backup file has reached the predetermined size, or when the user so desires, in order to create a new instance file containing the last values of the instances saved in the backup file and to create an empty backup file.

According to another characteristic, the values of the instances recorded in the backup file are accessible by a user before the merge with the instance file.

According to another characteristic, each line of the backup file corresponds to a modification, a deletion, a creation or a writing of an instance, and comprises a field containing the name of the instance, a field containing the value of this instance, and a field containing the identification of the type of operation performed on this instance.

According to another characteristic, prior to the merging of the instance file with the backup file, both of these files are copied onto the hard disk of the resource.

A second object of the invention is to provide a tool library that makes it possible to create a communication agent in a generic, simple and fast way.

This second object is achieved by the fact that the tool library for creating an agent for communication between a manager and at least one resource of a data processing system comprises a command which, from a formalized description of the resource, creates in the form of an executable program the protocol core of the communication agent that manages the resource.

According to another characteristic, the library comprises at least one development support function, which allows the user to develop methods of the resource capable of communicating with the protocol core and/or of updating at least one instance of the model of the resource and/or of reading at least one instance of the model of the resource.

A third object of the invention is to offer a process for communication between a manager and a resource using an agent according to the invention.

This object is achieved by the fact that the process for communication between a manager and a resource using the agent according to the invention comprises:

a first step for sending a request from the manager to the resource in order to read information of the resource, and a second step for the decoding of the request by the core of the agent in order to determine the instance corresponding to the desired information and the mode for obtaining this instance.

According to another characteristic, if the mode for obtaining the instance is the "direct" mode, the core of the agent constructs, then sends a request for a response to the manager, giving it the value of the instance existing in the model of the resource it manages.

According to another characteristic, if the mode for obtaining the instance is the "signal" mode, the core of the agent constructs, then sends a message to the method corresponding to the instance, in order to obtain the value of the instance.

The corollary subjects of the invention are a data processing system which includes at least one agent according to the invention and a medium for recording data such as a magnetic disk or a CD-ROM, and which incorporates a computer program for using an agent according to the invention and/or a tool library as defined above, and/or the process defined above for creating an agent according to the invention.

BRIEF DESCRIPTION OF THE DRAWINGS

Other characteristics and advantages of the present invention will emerge more clearly from the reading of the following description, with reference to the appended drawings, in which.

DESCRIPTION OF THE PREFFERED EMBODIMENTS

Figure 1:
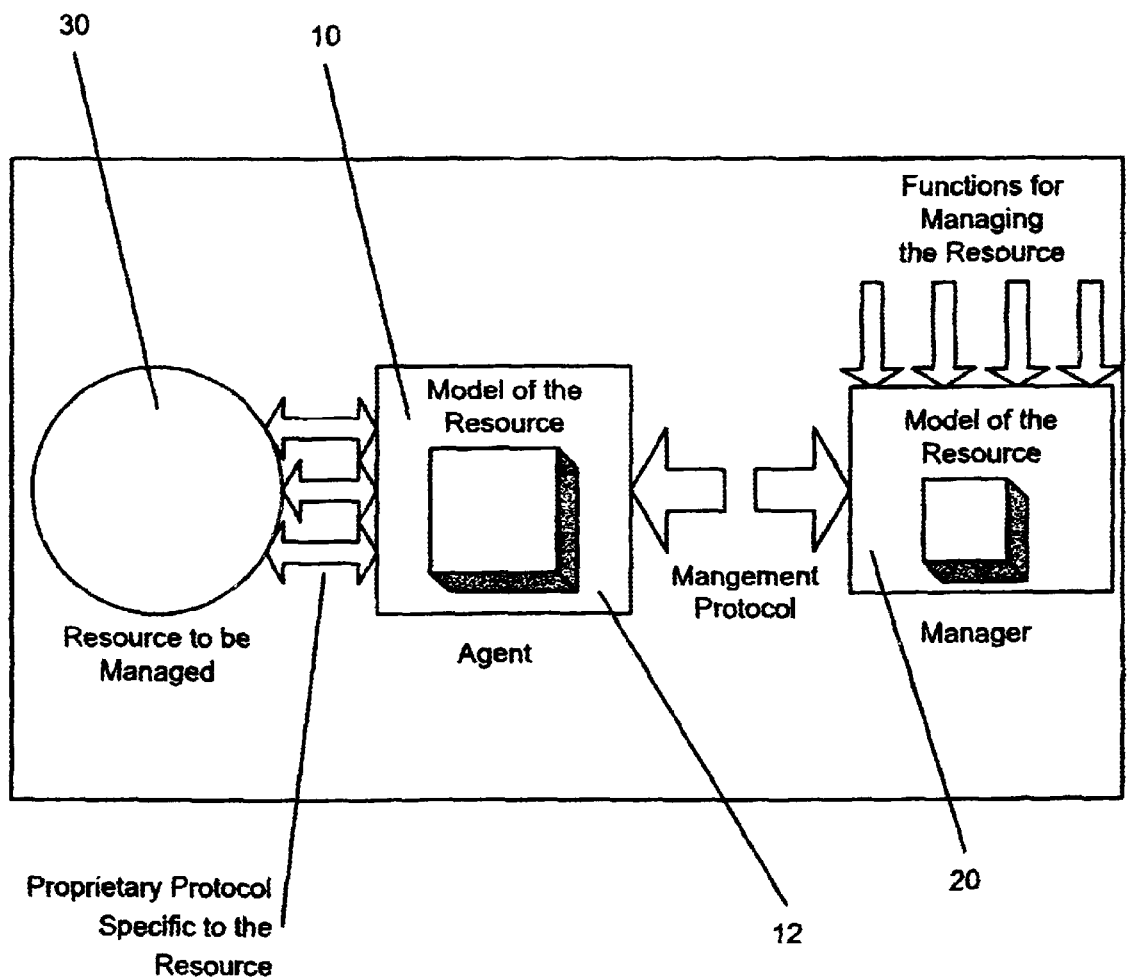
FIG. 1 represents a diagram of the relationships that exist between a manager, an agent, and a resource of a data processing system.

FIG. 1 represents a diagram of the relationships that exist between a manager, an agent, and a resource of a data processing system. The present invention relates to an agent

(10) for communication between a manager (20) and a resource (30) of the system to be managed. A manager (20) of a data processing system must be able to supervise all of the resources (30) of a system, even if the resources are remote. To do this, the manager does not directly call the resource to be managed, but uses a model (11) of this resource, organized into a sorted database. Ensuring the quality of the model of a resource for the purpose of managing it constitutes an important step. The quality of service available in the administrative platform for managing the data processing system, and particularly the resource, depends directly on the quality, the degree of accuracy, and the detail of the model designed.

The importance of the agent's role in this case is clear, since it is the agent that is responsible for maintaining and animating the model of the resource.

The agent in question in the present invention is an agent of the simple network management protocol (SNMP agent). The protocol SNMP, which is the dialogue between a manager and a resource, takes place in accordance with the most widely used protocol in the administrative platforms of the system. In a very schematic view, it is possible to divide an SNMP agent into standard communication layers and into layers that provide facilities for encoding and decoding syntaxes and manipulating objects.

The objects (or information quanta) are available through what is called a management information base (MIB), which is a sort of virtual database that models the resource to be managed. In deprecated language, it is often said that an agent manages an MIB.

An agent also contains, above all:

code for managing the management model of the resource to be managed, called the protocol core;

expertise on the resource in the form of controllers (based on the detail of the model managed by the agent).

Thus, in an agent, both code and specific expertise are associated with each resource to be managed.

The operations available through the management protocol SNMP, which enable the agent to manipulate the objects of the MIB it manages, are the following:

reading of an object (get)

reading of the next object (get-next)

writing of an object (set).

Let us also note that rather than the objects, which are actually templates or forms, it is the instances of these objects that are manipulated by the protocol SNMP and the agent.

In order to instantiate the objects of the MIB that it manages, an agent must search for the information directly in the physical resource by means of methods, which are procedures associated with a particular object and initiated each time it is necessary to perform an operation on the object in question. It is by means of these methods that the instances of the MIB assume a semantic value: depending on the way in which the value of an instance is searched for in the physical resource, this instance will have one meaning or another, or one function or another.

The agent according to the invention has the characteristic of comprising a protocol core developed automatically, by means of tools described below, from data specific to the resource to be managed. This specific data is provided in the form of an MIB. The core created handles the sending and the reception of SNMP frames from and to the manager, the encoding/decoding of these frames in accordance with the ASN.1 standard, as well as the access to the objects of the MIB. Thus, it is no longer necessary for the developer of an agent according to the invention to design what corresponds to the protocol core; he need only develop the MIB corresponding to the resource he wishes to manage by means of the agent. Advantageously, the syntax used to develop the MIB is an ASN.1-SNMP V1 syntax.

The core, and hence the agent, thus created is specific to the resource, but the creation process is generic. Thus, by modifying the data provided as input to the process for creating the protocol core, a new agent is obtained.

The MIB contains only the lexical and syntactic information of the resource describing the objects of the resource, and does not contain any semantic information. The model of the resource derived from the MIB is constructed in the core in the form of a database sorted in lexicographical order. This sorted data base contains the values of the objects of the resource managed by the agent. To develop this sorted database, the user must also provide as input to the creation process an instance file that will make it possible to initialize this sorted database. Since, as has been indicated, the MIB does not actually contain any semantic information, it is therefore necessary, in order to give a meaning to the information of the MIB, to provide the creation process with the initial instances for the sorted data base.

The protocol core of the agent according to the invention thus created allows the execution, by the manager in complete conformity with the SNMP standard, of the following primitives:

GET reading of an instance of an attribute;

GET-NEXT reading of the next attribute instance in lexicographical order;

SET modification of an attribute instance.

These primitives are supported by the following protocol data units (PDU):

snmp-get-request snmp-get-next-request snmp-set-request snmp-get-response

In addition, the agent according to the invention allows the emulation of verbs which do not originally belong to the SNMP standard but which, as a result of their frequent use in the management of distributed systems, have been inserted into other protocols, such as for example the Common Management Information Protocol (CMIP). It includes the following primitives:

CREATE creation of an instance in a table;

DELETE deletion of an instance in a table;

These two new primitives are supported by the PDUs:

snmp-set-request snmp-get-response

In order to perform the function for deleting an instance from the table corresponding to the sorted database, a specific attribute (gamDeleteObject) is added during the agent creation process. In order to delete an instance, it is sufficient to assign this attribute (gamDeleteObject), by means of the command SET, the name of the instance to be deleted.

For this purpose, the agent according to the invention comprises a second sorted data base (115, FIG. 3) for the management of objects specific to its operation. This second sorted data base pools attributes that are used, in particular, to delete an instance from the first sorted database (11, FIG. 3), but also attributes used in the agent initialization process, in the incremental backup process, and in the process for communication between methods, which are described below. The list below provides examples of attributes contained in the second sorted data base and their utilization.

A first attribute "gamInit-<name_agent>.0" is used during the synchronization between the core and the method of the agent <nameAgent>, during the phases for initialization and for initiating a merge. It can have the following values: COREBEGIN, COREEND, METHBEGIN, METHEND, MERGE.

A second attribute "gamDeleteObject-<name_agent>.0" is used to delete an instance in a table of the agent <nameAgent>. Its value corresponds to the attribute of the instance to be deleted.

A third attribute "<gamHostName-<name_agent>.0" is automatically set by the core of the agent OAT during its initialization and assumes the value of the name of the machine in which the agent <nameAgent> is installed.

A fourth attribute gamNotify-<name_agent>.0 is set for the communications between methods in the sockets interface mode; the identifier of the destination method is indicated in the field "result" and the attribute assumes the value of the information to be transmitted to another method.

Advantageously, at this stage of the agent's development, it is already capable of responding to inquiries from the manager. In fact, the core comprises a description of a resource to be managed through the sorted database, initialized by an instance file, even though the resource is not necessarily present, as well as the protocol for communicating with the manager. Of course, the virtual resource is frozen, since the information in the sorted data base is not updated by a method or methods. But the agent thus created can be used for simulation purposes. One of the advantages of this simulation is being able to develop, in the administrative platform, management functions involving a virtual resource. These functions communicate with an agent in exactly the same way they would if they actually had access to the resource. This makes it possible to modularize the connection chain between a manager and a managed resource, or to accelerate the obtainment of a complete management solution by parallelling the developments, or to perform load or performance tests by multiplying the number of agents simulated.

Of course, the object of the agent according to the invention also involves managing real resources. For this reason, the agent also comprises the expertise of the resource to be managed, in the form of methods which allow the instantiation of the model of the resource constituted by the sorted database of the core. The methods can be of any nature: for example, they can be, in addition to executables, functions of the operating system, interpreter lists (shell scripts), interpreted or compiled procedures, etc. They run continuously or are initiated periodically by querying the physical resource in order to load the sorted databases of the core. The function of the methods is simply to update the sorted database of the core by performing write or read operations in this base. These methods are designed individually by the developer of the agent according to the invention. In order to assist in this design, a tool library OAT is made available to the developer. This tool library comprises functions or primitives, for example in the form of executables, which allow the method to perform, in the sorted database of the core, the operations for reading the value of an instance (readInstSock or readInstDirect), for writing a new instance (writeInstSock or writeInstDirect), for deleting an instance (writeInstSock or writeInstDirect), for reading the next instance (readNextSock or readNextDirect), but also functions for initializing the method (connectSock or methInit), functions for exchanging information between methods (notifyMeth) and functions for communicating with the protocol core (receivesock or readPipe, writeRespSock or writeResp).

In order to allow the operations for writing and reading the methods in the sorted database of the core, as well as the requests to the methods for the protocol core, a communication interface exists between the core and the methods. Two types of communication interfaces are possible: an interface that establishes a communication process of the sockets type, called a sockets interface, or an interface using named pipes, called a direct interface.

Figure 3:
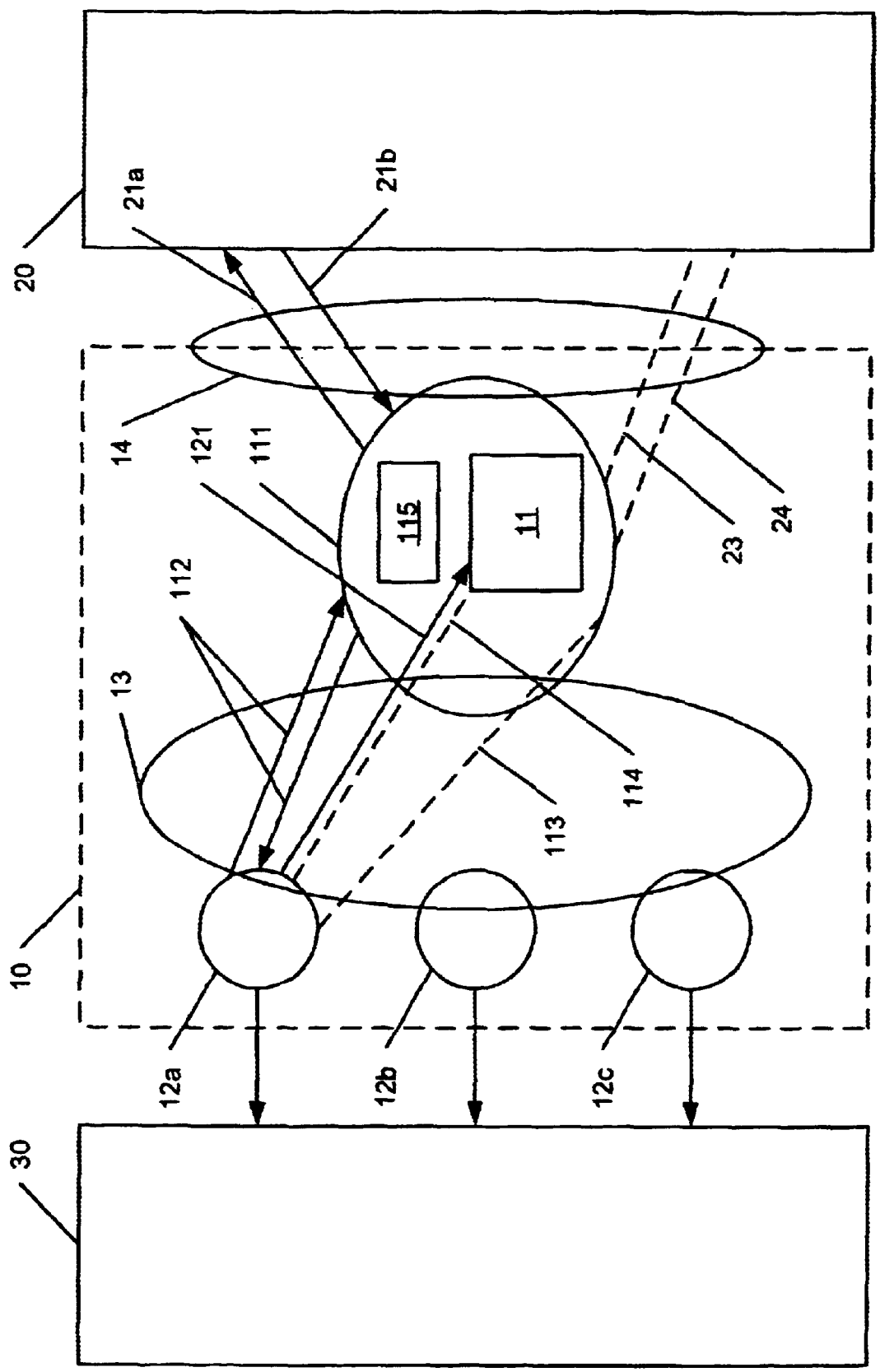
FIG. 3 represents the diagram of the operation for merging the instance file and the backup file.

FIG. 3 represents a general diagram of the communications between a manager, the agent and a computing resource in the sockets interface mode. In the sockets interface mode, the core (111) of the agent (10) communicates directly with at least one method (12a, 12b, 12c), for example through TCP/IP sockets (112) (Transmission Control Protocol/Internet Protocol sockets). The sending of a message in a socket (112) indicates the operation to be performed, the instance involved and possibly its value, as well as a return code. This mode is chosen during the agent creation process. Moreover, in order to further improve the performance of the agent (10) according to the invention, two policies for obtaining information on the resource are offered in this mode. When there is a reading of a piece of information (GET) or of a next piece of information (NEXT) by the manager, the value of the requested instance can, in a first mode, be searched for directly in the sorted database (11) of the core (111), for attributes that are relatively static in the system. In the first mode, the valuation of these attributes is left up to the method (12), which corresponds to the "direct" obtainment mode. In a second mode, the value of the instance is returned by the method (12) for dynamic attributes. If in this second mode the method (12) does not respond before the expiration of a given time period (timeOut), or if it is absent, the core (11) will respond either with a generic SNMP error, or with the preceding value contained in its sorted data base (11) (depending on the option chosen in the construction of the agent during the agent creation process), which corresponds to the "signal" obtainment mode.

The choice of one policy or another is made through an initialization file (<agt>.confget) in which, for each attribute managed by the agent, the mode for obtaining its value— "direct" or "signal" —is indicated. As a function of this choice, the tool OAT for constructing the agent defines, in addition to the protocol core, two application programming interfaces, ordinarily called API (Application Programming Interface), i.e., one interface API (13) for communicating to the methods and one interface API (14) for communicating with the manager. If the user has not indicated the policy to be applied for an attribute, by default it is searched for directly in the sorted databases of the core of the agent according to the invention. The same is true if the initialization file is empty or nonexistent. The chief advantages offered by the sockets mode of communication are the capability to link, through a dialog, a plurality of distinct methods with the same core and the capability to reroute one or more methods to a different machine or machines from the one in which the core is running.

Moreover, the sockets interface is based on the use of TCP/IP communication elements. This mode guarantees a better synchronization of the exchanges between the core (111) and the method or methods (12). Furthermore, it facilitates the task of the method developer by simplifying the initialization and monitoring mechanisms.

In the communications carried out between the core (111) and the methods (12) of an agent (10) according to the invention, two types of exchanges may be distinguished: protocol exchanges, which are the exchanges used on the initiative of the core (111) following an SNMP request from the manager (20), and the method exchanges, which are the exchanges used at the request of a method (12), when the resource (30) managed by the agent according to the invention modifies an indicator that characterizes it, and when a method (12) needs to read the value of an instance managed by the core (111). There are therefore two sockets (112, 121) for each method, i.e., a socket (112) for the SNMP messages and a socket (121) for the method messages. The core itself creates two listening sockets, each in a separate TCP port. The connection of a method (12) entails, for the core (111), the opening of two service sockets (112, 121) (each associated with a listening socket), through which flow the SNMP messages sent to this method and the method messages sent by the latter, respectively. All of the protocol exchanges between the core (111) of the agent (10) and the methods (12) are carried out via network sockets that are online, i.e., supported at the transport level by the TCP layer. Primitives for reading and writing in the sockets are made available to the developer of the method.

The protocol exchanges are invoked by a request (21a, 22) from the manager (20), which wants, first of all, to read a piece of information of the resource (30). The frame sent by the manager (20) is decoded by the protocol core (111), which identifies the desired instance and the "direct" or "signal" mode for obtaining this instance. If the "direct" mode is detected (21a), the core constructs and sends the response (21b), searching for the instance in the sorted database (11). If the "signal" mode is detected (22) the core (111) identifies the method (12) corresponding to the desired instance, constructs a message understandable by the method (12) and sends it to the latter through a socket (113). This message is understood by the method (12) by means of a specific reception function (receiveSock). The method (12a) queried will search for the desired instance in the resource (30) and respond to the core (111) using the write function (writeRespSock) containing the value of the instance. The response (114) from the method (12a) results in the updating by the agent of the sorted database (11) as well as the construction and the sending by the core (111) of a message (23) containing the instance requested by the manager (20). The protocol exchanges are invoked when the manager wants, secondly, to modify an instance of the resource (30). The frame (22) sent by the manager (20) is then decoded by the core (111), which identifies the method (12) in question and constructs a message (13) to be sent to this method (12) in order to modify the value of the instance of the resource. The method (12) receives the message using the reception function (receiveSock), executes the modification and responds (114) to the core (111). The response from the method results in the updating of the sorted database (11), as well as the construction and the sending of a response message (23) to the manager (20), indicating that the modification has been performed. The structure of all the messages constructed by the core (111) to be sent to the method (12) comprises:

the identification of the instance a field corresponding to the value of the instance an operation code a return code.

In the case of a request to read an instance or a request to read the next instance, the operation code is GET. The field corresponding to the value of the instance is empty for the message from the core to the method, and is equal to the value captured by the method in the message from the method to the core. The return code is either OK, if the method is capable of finding the value, or NOK, if it is not.

If the core receives from the method a message with a return code NOK, it constructs an error message to the manager and cancels the request. The management of the function GET-NEXT coming from the manager is left up to the core, which means that the method receives only GET commands from the core (111), and that it is the core that determines the next instance for constructing its GET message to be sent to the method.

In the case of a request to modify an instance, the operation code is SET, and the field corresponding to the value of the instance is equal to the desired value. The return code is either OK, if the method is capable of finding the instance and modifying it, or NOK, if it is not. If the core receives from the method a message with a return code NOK, it constructs an error message to the manager and cancels the request.

When a modification request (SET) or a creation request (CREATE) involves several attributes, the core submits these attributes one by one to the method. As soon as the method returns a code NOK, a response with a generic SNMP error is returned to the manager. Thus, it is strongly recommended that the developer of a method requiring the setting of several attributes of an instance, before performing the creation or the modification of this instance, respond with a return code OK for all the attributes except the last one, then judge the possibility for creation or modification with the complete knowledge provided by this last instance, before sending an acceptance (OK) or a denial (NOK) to the core of the agent OAT.

In addition, full compliance with the SNMP protocol has been improved, while maintaining full atomicity during an SNMP request involving a set of attributes. Atomicity consists of processing all of the attributes if all of the modifications are possible, or of not processing any of the attributes if any of the modifications is impossible. For this purpose, the core of the agent always transmits the instances contained in the same frame SNMP-SET to the method one by one, differentiating the last instance by means of the operation code transmitted to the method, which in the latter case is SETLAST.

Thus, the agent according to the invention makes it possible to ensure the complete atomicity of the SNMP-SET requests from the manager (20). This atomicity throughout the connection chain is explained in the following example:

1. the manager sends a frame SNMP-SET on the instances a, b and c;
2. the core of the agent receives this frame a, b, c;
3. the core of the agent transmits to the method a SET on the instance a;
4. the method responds OK for a to the core of the agent;
5. the core of the agent transmits to the method a SET on the instance b;
6. the method responds OK for b to the core of the agent;
7. the core of the agent transmits to the method a SETLAST on the instance c;
8. the method verifies the possibility for modifying a, b and c;
9. the method responds OK or NOK for c to the core of the agent;
10. the core of the agent either updates or does not update its databases;
11. the core returns a frame SNMP-NOERROR or SNMP-ERROR to the manager;
12. the method, if it has updated its INTERNAL variables or performed operations on the resources it controls involving the instances a and b, must save them or cancel them.

While all of the other instances are normally transmitted with an operation code equal to SET, the last one is sent to the method with an operation code equal to SETLAST. The method (12) is therefore built to react differently as a function of the operation code that the core (111) transmits to it. When the core transmits an operation code for modifying an attribute, the method reads the operation code of the message. If the operation code corresponds to a SET, the method verifies the possibility for modifying this attribute, stores the result of the modification in a file or a register, and responds to the core with a return code OK. If the operation code corresponds to a SETLAST, the method verifies the possibility for modifying the last attribute and checks to see whether all the modifications stored are possible. If any of the modifications is impossible, or if the modification of the last attribute is impossible, the method transmits a return code NOK; if not, the method responds with a return code OK. The return code NOK to the operation code SETLAST results in the cancellation of the entire request. The return code OK results in the validation, in the model (11) of the resource of the core (111), of all the modifications stored by the method.

The method exchanges take place in accordance with the same mechanism as the protocol exchanges: through the sending of messages in a TCP/IP "socket." The sending of the message is managed in the functions and primitives made available to the developer and written later. Thus, the method can write (writeInstSock) new values into the sorted databases of the core (11, 115), which allows it to create, modify or delete instances. Likewise, it can of course read (readInstSock) the value of a particular instance in these bases. It is also possible for the method to read, in the internal databases (11, 115) of the core, the next instance in lexicographical order (readNextSock). This allows the method, for example, to read all of the instances of a table.

The core, when it is initialized, listens to a list of sockets. When no method has yet been connected, the sockets that are part of this listening list are the method listening socket and the protocol data unit (PDU) socket. When a method is connected, an event occurs in the method listening socket, upon which the core opens a method service socket and waits for the connection of the method to the SNMP listening socket. Once this connection has been established, the core opens an SNMP service socket. Then, it resumes its listening, adding the new method service socket to the listening list. The disconnection of a method results in the closing of both service sockets that are associated with it and the deletion of the method service socket from the listening list. When a message (writeInstSock, readInstSock, readNextSock, or notifyMeth) arrives in a method service socket, the core processes the request before resuming its wait in the listening list.

The sockets interface mode makes it possible to have several methods coexist with the core of the agent. The agent can therefore know the method to which it must transmit a request coming from the manager. The concept of a method identifier was introduced for this purpose. This identifier is an integer that makes it possible to uniquely distinguish a method. The choice of this integer and its uniqueness for the same core is left up to the developer of the agent. For each attribute in the file <agt>.confget, the identifier of the method that manages this attribute is indicated. Thus, the distribution of an SNMP request to one method or another takes place as a function of the attribute involved in the request. When a method is initialized, it declares its identifier to the core so that the latter knows which method corresponds to a given SNMP service socket corresponds. This declaration takes place directly in the function for initializing the method (connectSock).

The following description relates more precisely to the direct interface mode of communication between the protocol core and the method. In the direct interface mode, the communication between the core and the method takes place through named pipes. The sending of a message in a pipe is coupled with the emission of a signal in order to warn the interlocutor (core or method) that a message has been sent to it. This mode requires the core to communicate with only one method. The principle of the direct interface mode differs only slightly from the sockets mode, though not, of course, in the inter-process communication resources used. In the direct mode, all the protocol exchanges between the core of the agent and the method take place through named pipes and through the sending of a signal SIGUSR2. The named pipes used for these protocol exchanges in the requests GET, NEXT, SET, CREATE or DELETE are <pipesDir>/<agtName>.pRespSnmp and <pipesDir>/<agtName>.pReqSnmp. The first pipe is created by the core of the agent according to the invention and is open for writing by the method for transmitting the responses to the SNMP requests (the function writeResp). The second pipe is created and is open for reading by the method for receiving the SNMP requests coming from the core of the agent.

The utilization of the signal SIGUSR2 allows both the core of the agent and the method to be dedicated to other tasks. Each write operation in a pipe is followed by a sending of the signal SIGUSR2 which warns the addressee that a message has just been transmitted to it. The method and the core of the agent can, of course, function without each other. This is achieved as a result of the opening of the pipes in a non-inhibiting mode.

During exchanges with a method in the direct interface mode, the core does not send a signal to the method when there is a response to a readInstDirect or readNextDirect, which allows the method process to use the signal SIGUSR1 for possible interceptions independent of the agent.

The named pipes used for these method exchanges, in the instance requests READINST, READNEXT, or WRITEINST, are <pipesDir>/<agtName>.pReqMeth and <pipesDir>/<agtName>.pRespMeth. The first pipe is created by the core of the agent and is open for writing by the method for transmitting instance requests (the functions readInstDirect, readNextDirect and writInstDirect) to the core. The second pipe is created and is open for reading by the method for receiving the responses to the requests readInstDirect and readNextDirect from the core of the agent.

Figure 4A:
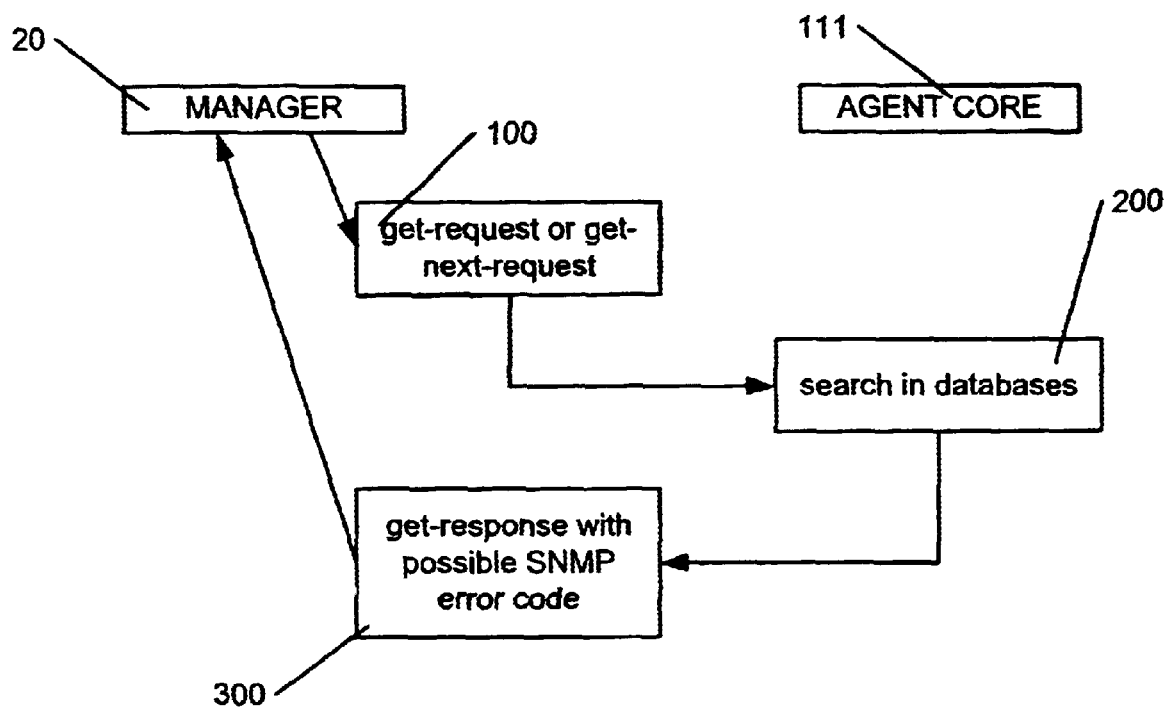
FIGS. 4A through 4E represent the flow charts of the processing by the agent of the various commands from a manager.

FIGS. 4A through 4E represent flow charts of the processing of various commands from a manager. FIG. 4A represents the flow chart of a request to read an instance by the manager (20) in the "direct" mode of obtaining the instance. The manager (20) sends a read request (100) to the agent (10). The core (111) of the agent searches (200) for the value of the instance in the sorted database and responds (300) to the manager, either with the value of the instance requested, or with an error message if the instance does not exist.

Figure 4B:
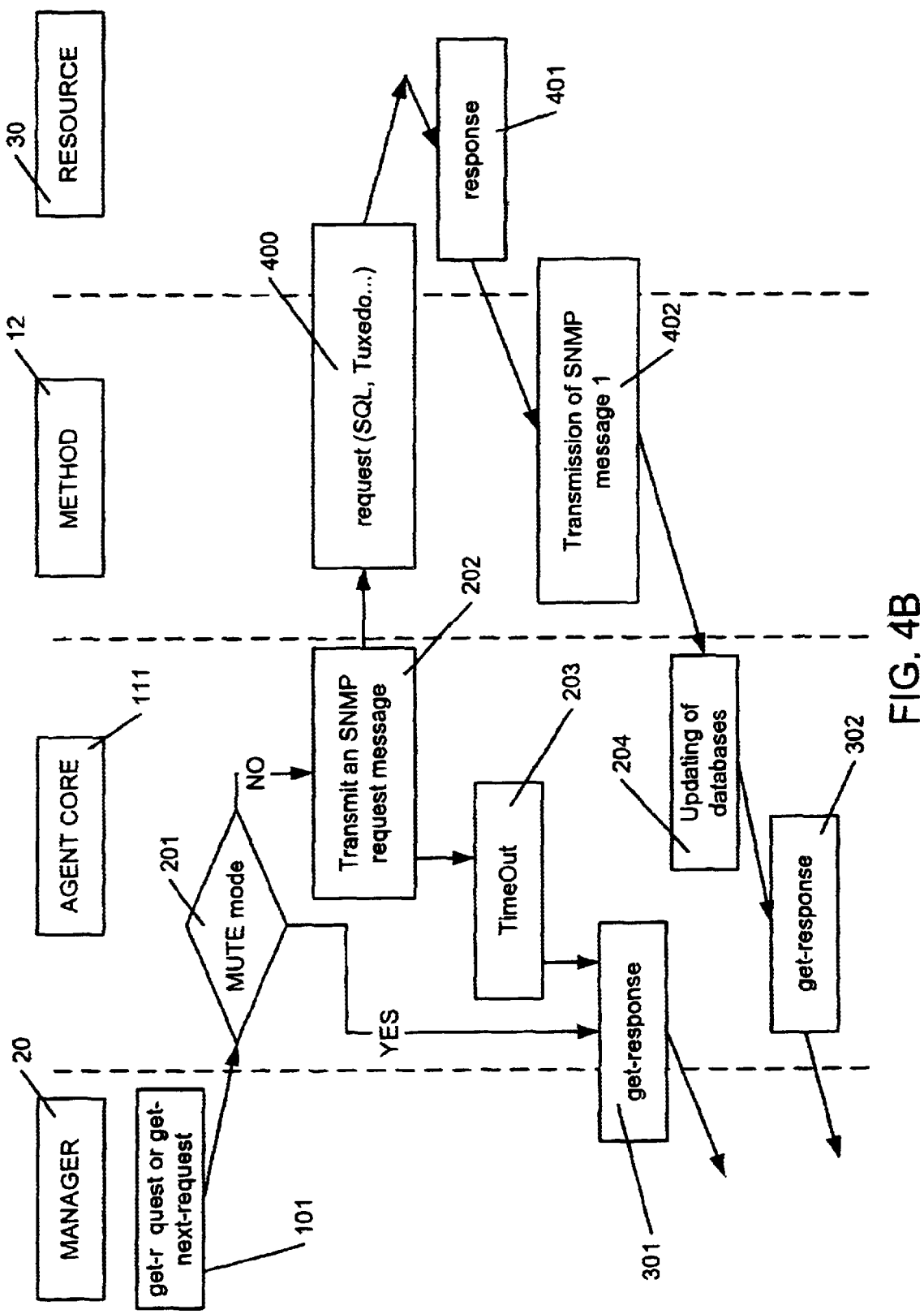

FIG. 4B represents the flow chart of a request to read an instance by the manager in the "signal" obtainment mode. The manager (20) sends the agent a request (101) "GET" to read an instance or "GETNEXT" to read the next instance. The agent then performs a test (201). If the core (111) is in the MUTE mode, described below, a message (301) giving the last value contained in the sorted database is sent to the manager (20). If not, the core (111) transmits an instance reading message (202) to the method (12) and activates a counter (203) of elapsed time "TIMEOUT". If the method (12) does not respond before the counter (203) reaches a certain value, the core (111) sends a message (301) to the manager containing the last value of the instance contained in the database. Upon reception of the message (202) the method (12) queries the resource (30) with a request (400) to know the value of the instance. The resource then sends a request (401) to the method (12). The latter then transmits a message (402) containing the value of the instance to the core (111). The core (111) performs an update (204) of the sorted database (11) with the value transmitted by the method, and sends a response (302) to the manager.

Figure 4C:
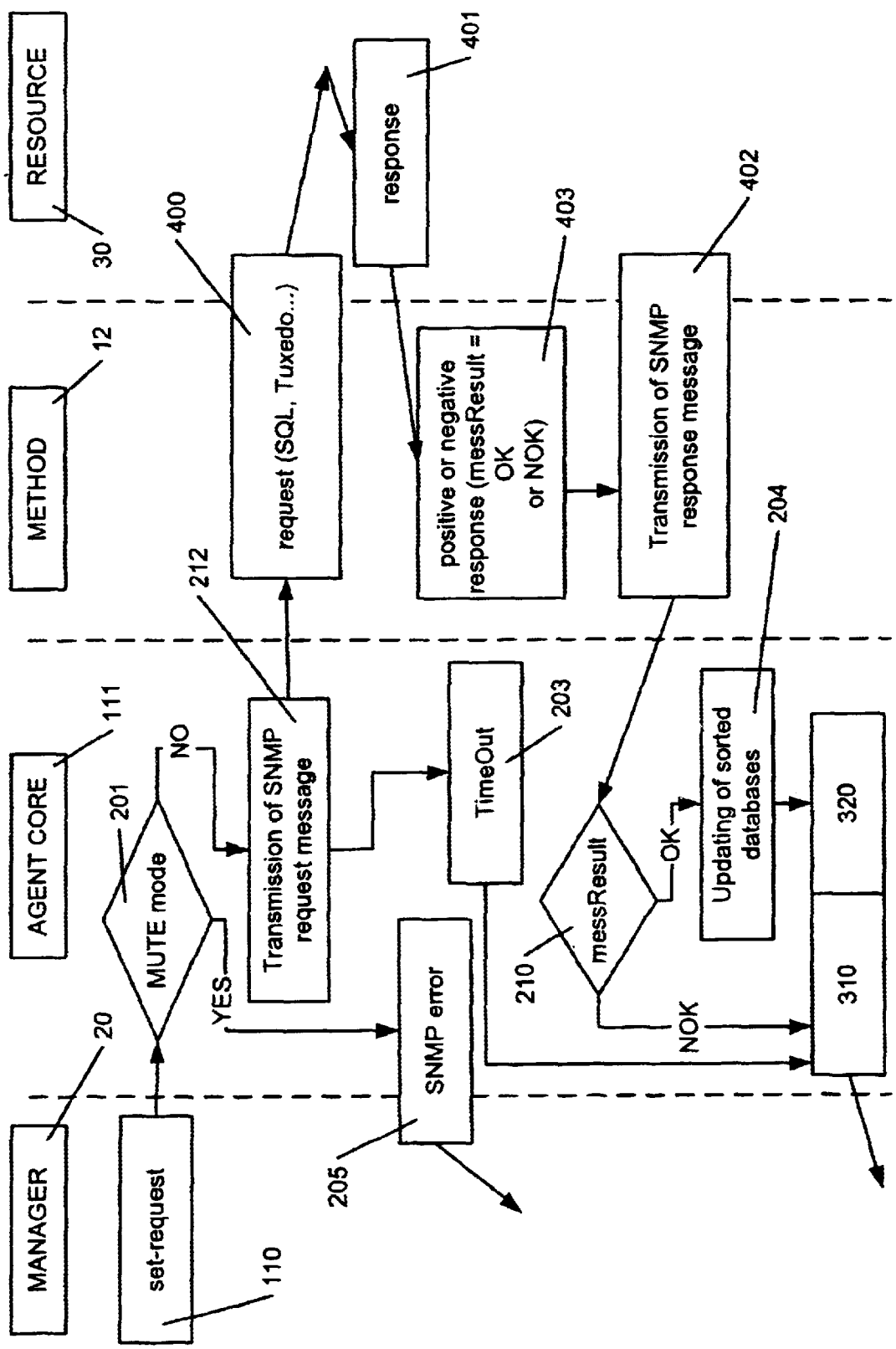

FIG. 4C represents the flow chart of an instance modification request from the manager. The manager (20) sends a modification request (110) to the core (111). The agent then performs a test (201) to determine whether it is in the MUTE mode. If the core is in the MUTE mode, described below, the core responds to the manager (20) with an error message (205); if not, the core (111) transmits an instance modification message (212) to the method (12) and activates a counter (203) of elapsed time "TIMEOUT". If the method (12) does not respond before the counter (203) reaches a given value, the core (111) sends an error message (310) to the manager. Upon reception of the message, the method (12) queries the resource (30) with a request (400) in order to modify the value of the instance. The resource sends a response (401) to the method (12) indicating through a result code (403) (OK or NOK) whether or not the modification is possible. The method (12) transmits to the core (11) a message (402) containing the result code. The core (111) then performs a test on the value of the result code. If the value of the code is OK, the core (111) performs an update (204) of the sorted database (11) and transmits a response (320) to the manager (20), indicating that the instance has been modified. If the value of the result code is NOK, the core (11) responds to the manager with an error message (310).

Figure 4D:
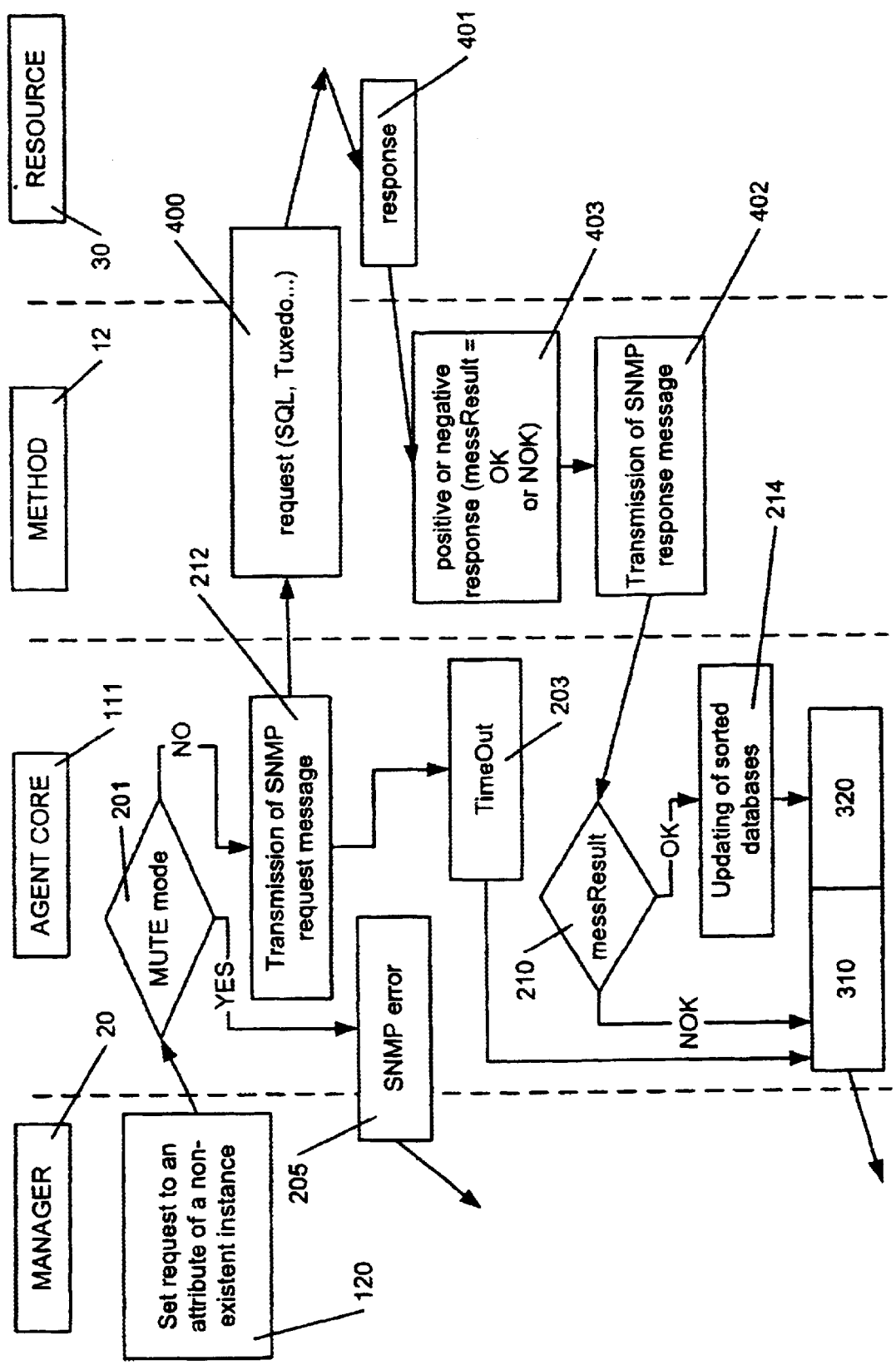
Figure 4E:
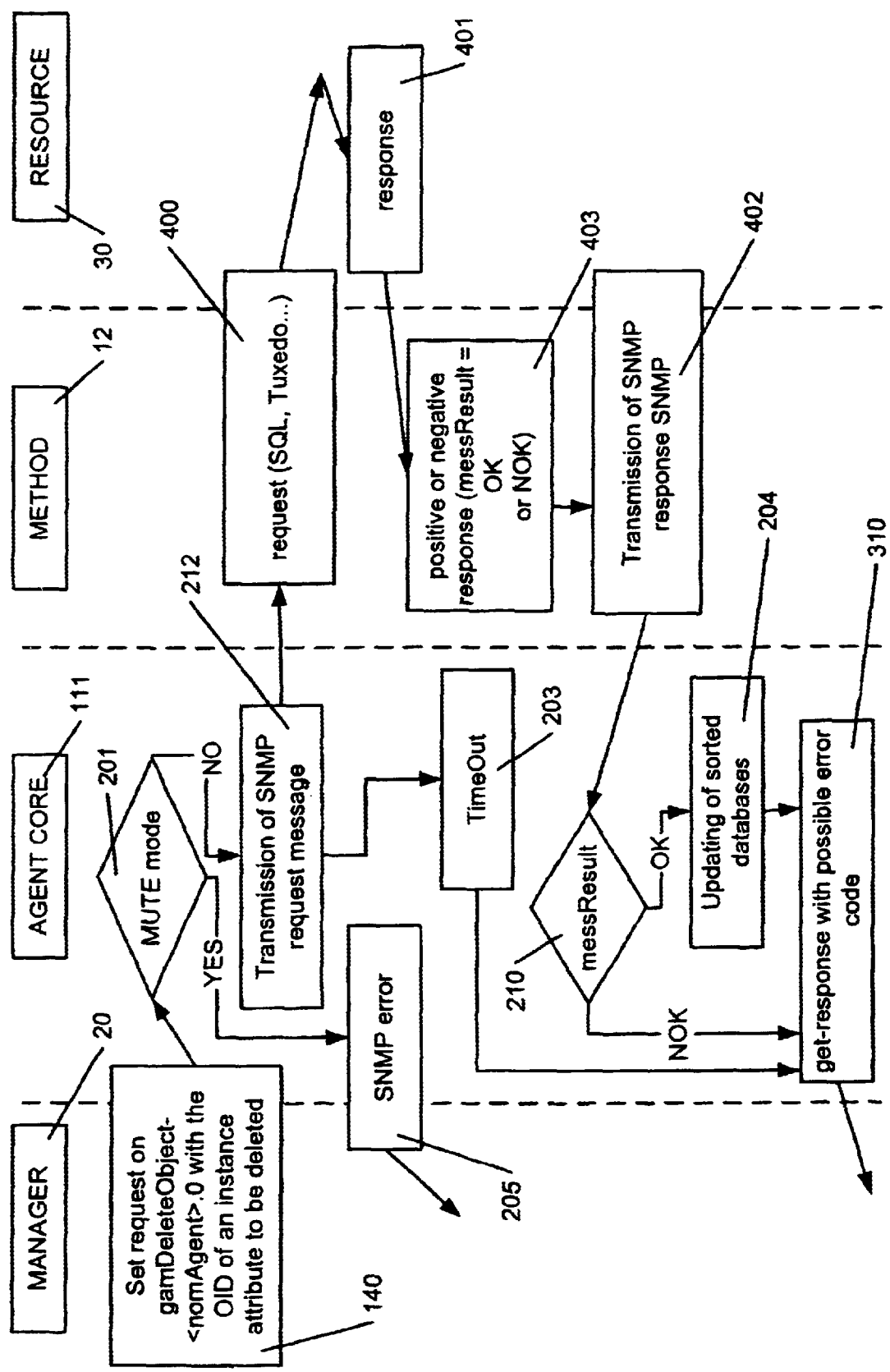

FIGS. 4D and 4E represent a flow chart for the creation of an instance and a flow chart for the deletion of an instance by the manager. These flow charts are exactly the same as the flow chart described in connection with FIG. 4C, except for the nature of the initial message sent by the manager. For the request to create an instance (FIG. 4D), the message is actually constituted by a request to modify an instance that does not exist. For the request to delete an instance (FIG. 4E), the message is actually constituted by a request to modify a particular instance (gamDeleteObject) of the data base of the core. The modification consists of assigning this particular instance the name (OID) identifying the object of the instance to be deleted.

Advantageously, the agent according to the invention makes it possible to maintain a trace of all the modifications that have occurred in the sorted database (11) of the protocol core. Accumulating management information is not usually the role of an SNMP agent. However, the agent according to the invention implements this additional functionality in order to best prevent any loss of information whatsoever. The incremental backup is, of course, installed in both the direct interface and sockets interface modes. Rather than archiving, the term incremental backup is preferred. In effect, the information is stored on the hard disk of the system as it is modified, and no longer at predetermined intervals. Thus, the requests resulting in a modification of the sorted databases (111) of the core (11) of the agent according to the invention are logged in a file known as an incremental file. The table below summarizes the various requests that can be transmitted to the core of the agent according to the invention and the operation applied to each of them:

| Source of the request | Nature of the request | Backup on disk |
|---|---|---|
| Manager | GET, independent of the method | NO |
| Manager | GET, subject to the method | NO |
| Manager | SET | YES |
| Manager | CREATE | YES |
| Manager | DELETE | YES |
| Method | readInstDirect | NO |
| Method | readNextDirect | NO |
| Method | writeInstDirect | YES |

The requests are backed up as soon as the method indicates its acceptance of the modification, even before the actual processing of this modification in the sorted databases of the core of the agent. Thus, the agent guarantees the retention of the information in case of a recovery after a failure. The incremental file thus constitutes a memory for the various modifications of the data managed by the SNMP agent according to the invention. Its structure makes it possible to save all of the information contained in a modification request. This incremental file is stored on a disk, for example under than name "<agent>.incr" in the same directory as the instance file <DIR>/agts/inst. Furthermore, the incremental file is structured so as to optimize the processing speed linked to the incremental backup mechanism. Thus, each line of the incremental file represents a modification request wherein the various fields are separated by blanks. Each line, and hence each request, is recorded sequentially in the incremental file. These fields are the name of the modified instance (with its suffix), the value of this instance, and the type of the operation. These various fields are, of course, constructed automatically by the core (111) of the SNMP agent according to the invention. The following table provides the structure of an incremental file as well as an example:

| Request | Instance | Value |
|---|---|---|
| CREATE | attribute.1 | 1 |
| SET | attribute.1 | 2 |
| DELETE | attribute.1 | Deleted 06/21/1998 at 18:12 |
| WRITEINST | attribute.1 | 6 |

This example illustrates all the operations that it is possible to save in an incremental file. In the example, all of the requests involve the same instance. The requests are in chronological order. Thus, it may be seen that the instance was deleted after having been created, modified by the manager, then re-valuated during a WRITEINST by the method. The sequential nature of the incremental file guarantees that the chronological order of the requests is maintained.

Figure 2:
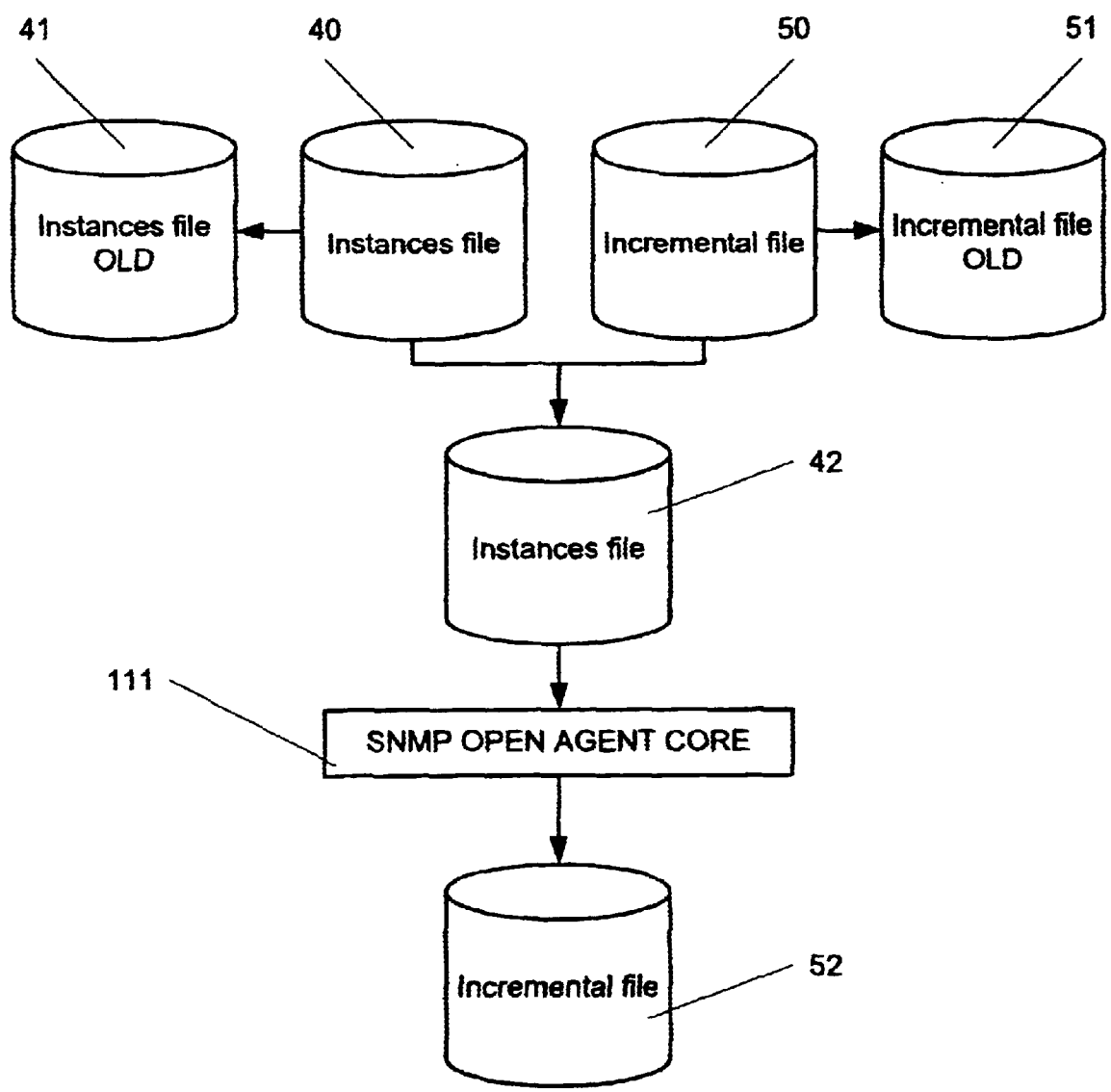
FIG. 2 represents a general diagram of the communications between a manager, the agent according to the invention and a computing resource in the sockets interface mode.

FIG. 2 represents the mechanism for merging the incremental file and the instance file. The incremental backup file can be used during the initialization of the agent according to the invention. The core (111) of the agent, when it is initialized in connection with the instance file (40), naturally takes into account the modifications that have occurred, thanks to the incremental file (50). There is therefore a merge of the instance file (40) with the incremental file (50) during an initialization of the core (111) of the SNMP agent. After this merge, the core (111) has a new, updated instance file (42). Prior to this merge, a copy (41) of the instance file (40) is made in an OLD file (41). A copy (51) of the incremental file (50) is made in an OLD file (51). The two instance (40) and incremental (50) files are merged into a new instance file (42) on output. From then on, the core of the SNMP agent can be initialized and can retrieve its data from the new instance file (42) resulting from the merge. Finally, as soon as the core (111) of the SNMP agent is initialized, it has an empty incremental file (52) in which it can save the modifications of its databases.

In case of an absence of either of the files at the beginning of the initialization phase of the core of the SNMP agent, the behavior of the agent corresponds to that indicated in the table below:

| Instance file | Incremental file | Behavior | Situation |
|---|---|---|---|
| Present | Present | Merge of the 2 files | Normal situation |
| Present | Absent or empty | The instance file is saved | No modifications since the last merge |
| Absent OLD file present | Present | Merge of the incremental file with the OLD instance file | A failure occurred during the last merge |
| Absent OLD file present | Present | The incremental file becomes the instance file | A serious failure occurred during the last merge |
| Absent OLD file present | Absent | The OLD instance file becomes the instance file | A failure occurred during the last merge; there have been no modifications since; a highly improbable situation |
| Absent OLD file present | Absent | A minimal instance file is generated | First initialization or very serious failure |

These behaviors of the core (111) of the SNMP agent, when the backup files are in a nonstandard configuration (i.e., the files are not both present), make it possible to easily process the failure recovery phases. During its initialization, the method can decide to load the management information it needs from the instance file, if the core of the SNMP agent is not capable of providing it (such a case generally occurs if the core is absent). It will then activate the same merging mechanism using a call to a function initMerge of the tool library OAT of the agent. The method could also use an updated instance file. The concurrent access to this merge is completely managed by the core (111) and the tool library "OAT".

With the incremental backup mechanism, periodic archiving is no longer absolutely necessary. On the other hand, a reintegration of the modifications that have occurred since the startup of the agent is still essential. As has been seen, these modifications are fully logged in the incremental file (50). Thus, during the normal operation of the agent, the information contained in the incremental file (50) is processed in order to integrate it into the sorted databases (11) of the core (111) of the SNMP agent. This integration during operation is initiated, not after the expiration of a given time period, but when the incremental file (50) has reached a size limit. This size limit can be indicated in the starting parameters of the SNMP agent. Furthermore, the method can decide to initiate this integration of the incremental file itself, while the core of the agent is in operation, by sending it a request for a write operation (writeInstSock or writeInstDirect) on a particular instance of the sorted database, specific to the agent (gamInit-<name_agent>.0) valuated with the constant MERGE. A call to a primitive for initiating the merge (runMerge) performs the same operation. In an integration of this type, the same process as in the initialization phase is used. There is a copy of the instance (40) and incremental (50) files, then a merge into the new instance file (42). As soon as this integration starts, a new empty incremental file (52) is made available to the core of the agent. Thus, the process for integrating the incremental backup is absolutely non-inhibiting for the core of the SNMP agent, which can therefore continue with its normal tasks during this process.

It is imperative, when a failure occurs and an agent must be stopped, to be able to restart the agent, while losing as little as possible, if not none, of the information managed by the agent since its last startup. The main objective of the incremental backup mechanism of the agent according to the invention, as well as the installation, implied by this mechanism, of a memory in the SNMP agent, is fully in keeping with this imperative. Because of the very existence of the incremental file, the agent according to the invention guarantees a minimal, if not nonexistent, loss of the modifications that have occurred in the sorted data base (11) of the core (111) since the previous initialization of the latter. The execution of the incremental backup during the operation and initialization of the SNMP agent also guarantees better retention of the management information during a failure recovery. The failure recovery phases are facilitated and optimized by the behavior adopted by the core of the SNMP agent during the initialization or the integration of the incremental backup, summarized in the core behavior table described above. In fact, no matter what the configuration of the instance (40) and incremental (50) files, the SNMP agent according to the invention is capable of recovering, in the best possible condition, the management information managed by the agent in the state in which it was before the failure occurred.

The present invention also relates to a tool for creating the agent described above. The process for creating the core of the agent has been mentioned previously in the description; this process is implemented by a tool whose description follows. The tool OAT for creating an agent according to the invention comprises a specific command (buildagt) which, from a formalized description of a resource, automatically creates the protocol core of the SNMP agent specific to the resource that is the subject of the formalized description. As explained above, the formalized description is a management information base (MIB), advantageously written in the ASN.1 MIB SNMP V1 format. From this MIB, the command (buildagt) automatically creates the executable program corresponding to the protocol core of the agent according to the invention, compiling with the latter the model of the resource managed by the core. The result of the command (buildagt) is therefore a compiled program that is able to dialogue with the manager of the resource via an SNMP communication protocol, and to construct messages requesting at least one method to respond to requests from the manager and update a model of the resource, also constructed by the command for creating the agent (buildagt). The model of the resource is advantageously in the form of a sorted database, as described above. Thus, the command for creating the agent according to the invention advantageously makes it possible to automatically create, using a generic process, an agent core specific to a resource, thus freeing the developer of the agent from having to design the protocol core of said agent.

In order to develop the sorted database (11) of the core (111), the command for creating the agent (buildagt) needs an instance file and a configuration file (agt.confget) which determine, for each instance of the model, the mode for obtaining instance values ("direct" or "signal"), and in the case of the utilization of the sockets interface mode, the identifier of the method that is associated with it. On output, the command for creating the agent also produces files for the operation of the core of the agent according to the invention, including a configuration file of the communities of the agent and their rights, and a file that makes it possible to match the identifier of an object (OID: Object Identifier) in the SNMP protocol with its full name. This last file subsequently makes it possible to use, for example in the instance file, the full name of the instance rather than its OID, which considerably simplifies the writing of the instance file. Advantageously, the language in which the program corresponding to the core is written is a compiled language, in order not to interrupt the resource in which the agent is installed.

We have just seen that the protocol core manages the instances of the resource through a database sorted in lexicographical order. This lexicographical order is linked to the way the instances managed by the agent are identified. These instances are identified by the model represented by the MIB, described in the form of a tree, a node of the tree corresponding to an instance. These trees are modeled in the MIB in the form of a table in which each column corresponds to the indicators and each line corresponds to the particular instances. In order to mark each line of the table in a unique way, an index of the protocol SNMP V1 is used. An index is an indicator of the base corresponding to an attribute. When the manager sends a request to read or modify a particular instance, the instance is located by means of the index. The user's request is entered in "English", then retranscribed using the OID (Object Identifier) of the protocol SNMP of the manager. This OID is a sequence of positive integers in accordance with the SNMP standard. The value of the instance is marked by the name of a column (indicator) that includes the index (instance) corresponding to the line of the instance. The indexing of the instances allows them to be stored in lexicographical order. This order is determined by the path through the trees of the model in the increasing order of the various nodes. The name of an instance corresponds to the path it is necessary to follow from the root of the tree in order to reach the instance.

As described above, the developer of the agent according to the invention has the use of a tool library OAT comprising various functions for designing the various methods specific to the resource to be managed. When the methods and the core are constructed, the agent thus created must be initialized in order to be integrated with the resource. Because of the different modes of communication between the core and the method or methods (sockets interface mode or direct interface mode), the initialization is different according to each of the modes chosen. In the sockets interface mode, the initialization of the agent is much simpler than in the direct interface mode. In fact, each method can call the function for initializing the method (connectSock) simply by indicating its identifier. On the other hand, in this mode it is necessary to make sure that the core of the agent starts first, before each method. Moreover, as seen above, the architecture of an agent in the sockets interface mode uses two TCP ports in which the core creates two listening sockets. These TCP ports must be declared in a file by indicating the service name. In the direct interface mode, the communication via named pipes and signals between agent core and method entails a sharing of system resources between these components. Each entity, core and method, must, when it is initialized, create and open the various named pipes they both use for reading, open the ones they use for writing, and make the identifier of its process known so that the other entity can send it signals. Thus, the method must, as soon as it is initialized, execute a call to the method initialization function (methInit) made available to the developer of the agent this function communicates the identifier of the method's process to the core, by writing it in a file. The initialization function "methInit" takes care of creating and opening the named pipe in which the method will be able to read the SNMP requests (pipeReqSnmp). If the core has already been initialized, an opening of the named pipe in which the method will write the responses to the SNMP requests (pipeRespSnmp) is also performed. Furthermore, the function methInit performs the creation and the opening of the pipe in which the method will read the responses to the method requests transmitted by the core (pipeRespMeth). Likewise, if the core has been initialized, the function opens the pipe in which the method will write the method requests (pipeReqMeth) and finally, sends a request for writing an instance (WRITEINST) to the core. When the method is initialized, the core of the agent does not interrupt this initialization by transmitting SNMP protocol requests to the agent. The core is then in a so-called MUTE mode. This mode is initiated when the instance gamInit-<nameAgent>.0 is assigned a particular value (METHBEGIN). This is done by the method by means of a call to the function methInit. When the core of the core of the agent according to the invention is in the MUTE mode, it no longer transmits messages to the method, except of course for the responses to the direct read requests readInstDirect and readNextDirect that the method is capable of sending it during the initialization of the latter. If the method has been initialized first, it will not be able to open the pipe or pipes it uses for writing by calling the function methInit. It must do so when the core has been initialized. Also, if the core is initialized after the method, it notifies the method that it is starting, by sending a request for an instance modification (SET) on an instance of an attribute that belongs to it (gamInit-<agentName>.0) assigned a particular value (COREBEGIN).

As described above, the developer of the agent according to the invention has the use of tool library OAT for constructing the specific method or methods of access to the resource that will search in the resources for the values of the various instances and update the model managed by the core, as well as respond to requests from the core. The tool library essentially comprises primitives and various functions in accordance with the mode of communication (sockets interface mode or direct interface mode) between the core and the method or methods, which make it possible to define a communication API (application programming interface). In the sockets interface mode, the following primitives are accessible to the developer: readInstSock, writeInstSock, readNextSock.

readInstSock

Syntax readInstSock <serverName> <agtName> <timeout> <inst>

Function

The primitive "readInstSock" reads the value of the instance <inst> in the sorted databases of the core of the agent. The agent is identified by the parameter <agtName>. The user must provide the full name of the instance with its suffix. The primitive displays the value of the instance through the standard output. The user must also indicate in the parameter <serverName>the machine in which the core of the agent is located. If there is no response after a given time <timeOut>, the function returns an error.

writeInstSock

Syntax writeInstSock <serverName> <agtName> <inst> <val>

Function

The primitive "writeInstSock" writes an instance <inst> and its value <val> in the sorted databases of the core of the agent. The agent is identified by the parameter <agtName>. The user must provide the full name of the instance with its suffix. If the instance exists, its value is modified; if not, it is created. The user must also indicate in the parameter <serverName> the machine in which the core of the agent is located. Only new tabular instances (whose suffix is not ".0") can be created.

readNextSock

Syntax readNextSock <serverName> <agtName> <timeout> <inst>

Function

The primitive "readNextSock" reads the value of the next instance in lexicographical order of <inst> in the sorted databases of the core of the agent. The agent is identified by the parameter <agtName>. The user must provide the full name of the instance with its suffix. The primitive displays the value of the instance through the standard output. The user must also indicate in the parameter <serverName> the machine in which the core of the agent is located. If there is no response after a given time <timeOut>, the function returns an error. The user can search for the first instance managed by the core of the agent by indicating root.0 in the parameter <inst>.

In the sockets interface mode, the following functions are accessible to the developer: readInstSock, writeInstSock, readNextSock, receiveSock, writeRespSock:

readInstSock

Type returned

GAMResultType

Parameters

GAMMessType*messSock const int sock_meth const long timeOut

Description

The function "readInstSock" that reads the value of an instance in the "sockets" mode comprises the above parameters. The name of the instance with its suffix must be placed in "messSock.inst". The operation "messSock.operation" is automatically set to READINST by the function. The value of the instance is returned in "messSock.val". The descriptor "sock_meth" of the socket must be indicated.

If there is no response after a period "timeOut" of seconds, the function returns an error. The error code returned is also reported in "messSock.result". The first parameter of the function "readInstSock" is a pointer to a type structure "GAMMessType", since various fields of this structure (operation, inst, val and result) are set during the execution of the function.

readNextSock

Type returned

GAMResultType

Parameters

GAMMessType*messSock const int sock_meth const long timeOut

Description

The function "readNextSock" that reads the value of the next instance in lexicographical order in the sockets mode comprises the above parameters. The name of the preceding instance with its suffix must be placed in "messSock.inst". It is possible to search for the first instance managed by the core of the agent by indicating "root.0" in the parameter "messSock.inst". The operation "messSock.operation" is set to READNEXT by the function. The name of the next instance is returned in "messSock.inst". The value of the next instance is returned in "messSock.val". The descriptor "sock_meth" of the socket must be indicated.

If there is no response after a period "timeOut" of seconds, the function returns an error. The error code returned is also reported in "messSock.result". The first parameter of the function "readNextSock" is a pointer to a type structure "GAMMessType", since various fields of this structure (operation, inst, val and result) are set during the execution of the function.

writeInstSock

Type returned

GAMResultType

Parameters

GAMMessType messSock const int sock_meth

Description

The function "writeInstSock" that writes an instance into the sorted data bases of the core of the agent in the sockets mode comprises the above parameters. The name of the instance with its suffix must be placed into "messSock.inst" and its value into "messSock.val". The operation "messSock.operation" is set to WRITEINST by the function. The descriptor sock_meth of the socket must be indicated. No acknowledgement message from the core is expected. Thus, only the return code of the function reports the sending of the message to the core of the agent. In particular, if there is an attempt to create a non-tabular instance, the core of the agent will have actually prevented this illegal creation, but the function "writeInstSock" will not have returned an error.

receivesock

Type returned

GAMResultType

Parameters

GAMMessType*messSock const int sock_snmp

Function

The function "receiveSock" that reads a message "messSock" in the TCP socket "sock_snmp" comprises the above parameters. This function can be used by the method to read the SNMP requests that the core of the agent transmits to it in the socket mode. It performs an integrity check on the message received. In other words, with the return of this function, the structure messSock is properly completed.

writeRespSock

Type returned

GAMResultType

Parameters

GAMMessType*messSock const int sock_snmp

Function

The function "writeRespSock" that responds to an SNMP request from the core of the agent in the sockets mode comprises the above parameters. The fields operation and inst must be identical to those transmitted by the core in the SNMP request. This SNMP request message will have been able to be read by the method by means of the function "receiveSock". The value of the instance must be placed in "messSock.val". The descriptor "sock_snmp" of the TCP socket must be indicated. This socket will have been able to be opened in the method by means of the function "connectSock".

In the direct interface mode, the following primitives are accessible to the developer: readInstDirect, WriteInstDirect, readNextDirect.

readInstDirect

Syntax readInstDirect <serverName> <agtName> <timeOut> <inst>

Function

The primitive "readInstDirect" reads the value of the instance <inst> in the sorted databases of the core of the agent. The agent is identified by the parameter <agtName>. The user must provide the full name of the instance with its suffix. The primitive displays the value of the instance through the standard output. The user must also indicate in the parameter <serverName> the machine in which the core of the agent is located. If there is no response after a given time <time Out>, the function returns an error.

writeDirectSock

Syntax writeInstDirect <serverName> <agtName> <inst> <val>

Function

The primitive "writeInstDirect" writes an instance <inst> and its value <val> into the sorted databases of the core of the agent. The agent is identified by the parameter <agtName>. The user must provide the full name of the instance with its suffix. If the instance exists, its value is modified; if not, it is created. The user must also indicate in the parameter <serverName> the machine in which the core of the agent is located. Only new tabular instances (whose suffix is not ".0") can be created.

readNextDirect

Syntax readNextDirect <serverName> <agtName> <timeOut> <inst>

Function

The primitive "readNextDirect" reads the value of the next instance in lexicographical order of <inst> in the sorted databases of the core of the agent. The agent is identified by the parameter <agtName>. The user must provide the full name of the instance with its suffix. The primitive displays the value of the instance through the standard output. The user must also indicate in the parameter <serverName> the machine in which the core of the agent is located. If there is no response after a given time <timeOut,> the function returns an error. The user can search for the first instance managed by the core of the agent by indicating root.0 in the parameter <inst>.

In the direct interface mode, the following functions are accessible to the developer: readInstDirect, WriteInstDirect, readNextDirect, readPipe, readResp.

readInstDirect

Type returned

GAMResultType

Parameters

GAMMessType*messPipe const char*gamAgtDir const char*agtName const long pipeReqMeth const long pipeRespMeth const long timeOut Function The function "readInstDirect" that reads the value of an instance in the direct mode comprises the above parameters. The name of the instance with its suffix must be placed into "messPipe.inst". The operation "messPipe.operation" is automatically set to READINST by the function. The value of the instance is returned in "messPipe.val". The directory "gamAgtDir" of the core of the agent and the name "agtName" of the agent must be indicated. It is also necessary to indicate the descriptors "pipeReqMeth" and "pipeRespMeth" of the named pipes. These pipes will have been able to be opened in the method by means of the function "methInit" described below. The message of the request is written by the function in the named pipe "pipeReqMeth". The response message is read by the function in the named pipe. The exchanges between the method and the core of the agent are synchronized by the function by means of the reserved signal SIGUSR1. If there is no response after a time limit "timeOut" of seconds, the function returns an error. The error code returned is also reported in "messPipe.result". The first parameter of the function "readInstDirect" is a pointer to a type structure "GAMMessType", since various fields of this structure (operation, inst, val and result) are set during the execution of the function.

readNextDirect

Type returned

GAMResultType

Parameters

GAMMessType*messPipe const char*gamAgtDir const char*agtName const long pipeReqMeth const long pipe RespMethod const long timeOut Description The function "readNextDirect" that reads the value of the next instance in lexicographical order in the direct mode comprises the above parameters. The name of the preceding instance with its suffix must be placed in "messPipe.inst". It is possible to search for the first instance managed by the core of the agent by indicating "root.0" in the parameter "messPipe.inst". The operation "messPipe.operation" is set to READNEXT by the function. The name of the next instance is returned in "messPipe.inst". The value of the next instance is returned in "messPipe.val". The directory "gamAgtDir" of the core of the agent and the name "agtName" of the agent must be indicated. It is also necessary to indicate the descriptors "pipeReqMeth" and "pipeRespMeth" of the named pipes. These pipes will have been able to be opened in the method by means of the function "methInit" described below. The message of the request is written by the function in the named pipe "pipeReqMeth". The response message is read by the function in the named pipe "pipeRespMeth". The exchanges between the method and the core of the agent are synchronized by the function by means of the reserved signal SIGUSR1. If there is no response after a time limit "timeOut" of seconds, the function returns an error. The error code returned is also reported in "messPipe.result". The first parameter of the function "readNextDirect" is a pointer to a type structure "GAMMessType", since various fields of this structure (operation, inst, val and result) are set during the execution of the function.

writeInstDirect

Type returned

GamResultType

Parameters

GAMMessType messPipe const char*gamAgtDir const char*agtName const long pipeReqMeth Function The function "writeInstDirect" that writes an instance into the sorted databases of the core of the agent in the direct mode comprises the above parameters. The name of the instance with its suffix must be placed into "messPipe.inst" and its value into "messPipe.val". The operation "messPipe.operation" is set to WRITEINST by the function. The directory "gamAgtDir" of the core of the agent and the name "agtName" of the agent must be indicated. It is also necessary to indicate the descriptor of the named pipe "pipeReqMeth". This pipe will have been able to be opened in the method by means of the function "methInit" described below. The request message is written by the function in the named pipe pipeReqMeth. The sending of the message from the method to the core of the agent is synchronized by the function by means of the reserved signal SIGUSR1. No acknowledgement message from the core is expected. Thus, only the return code of the function reports the sending of the message to the core of the agent. In particular, if there is an attempt to create a non-tabular instance, the core of the agent will have actually prevented this illegal creation, but the function writeInstDirect will not have returned an error.

readPipe

Type returned

GAMResultType

Parameters const long dpipe

GAMMessType*messPipe

Function

The function "readPipe" that reads a message "messPipe" in the named pipe "dpipe" comprises the above parameters. This function can be used by the method to read the SNMP requests that the core of the agent transmits to it in the direct mode.

writeResp

Type returned

GAMResultType

Parameters

GAMMessType messPipe const char*gamAgtDir const char*agtName const long pipeRespSnmp Function The function "writeResp" that responds to an SNMP request from the core of the agent in the direct mode comprises the above parameters. The fields operation and inst must be identical to those transmitted by the core in the SNMP request. This SNMP request message will have been able to be read by the method by means of the function "readPipe". The value of the instance must be placed in "messPipe.val". The directory "gamAgtDir" of the core of the agent and the name "agtName" of the agent must be indicated. It is also necessary to indicate the descriptor of the named pipe "pipeRespSnmp". This pipe will have been able to be opened in the method by means of the function methInit described below. The response message is written by the function in the named pipe "pipeRespSnmp". The sending of the message from the method to the core of the agent is synchronized by the function by means of the reserved signal SIGUSR2.

The developer also has access to initialization functions in each mode:

ConnectSock (sockets interface mode)

Name connectSock

Parameters const char*agtName const char*serverName const int methId int*sock_meth int*sock_snmp Description The function "connectSock" that establishes the connection of a method to the core comprises the above functions. The name of the agent is sent in "agtName", the name of the machine in which the core is running is sent in "serverName", and the identifier of the method arbitrarily chosen by the developer so as to be unique for the same core is sent in "methId". The descriptor of the socket through which the method will transmit its requests (writeInst, readInst, etc.) to the core is returned in "sock_meth". The descriptor of the socket through which the core will submit to the method the requests from the manager is returned in "sock_snmp". The function "connectSock" establishes the connections of the two TCP sockets and sends the core a message that lets it know the identifier of the method.

methInit (direct interface mode)

Name methInit

Parameters const char*gamAgtDir const char*pipesDir const char*agtName long*pipeRespSnmp long*pipeReqSnmp long*pipeReqMeth long*pipeRespMeth Description The function "methInit" that initializes the method comprises the above parameters. The developer must indicate the directory "gamAgtDir" of the core of the agent, the directory "pipesDir" of the pipes used by the agent, and the name "agtName" of the agent. The function "methInit" opens the named pipes used to communicate with the core of the agent and returns pointers to the descriptors of these pipes. The parameters of the function "methInit" corresponding to the descriptors of these pipes are pointers, since they are assigned values during the execution of the function. The function "methInit" sends the core of the agent a message of the type for writing an instance (WRITEINST), which assigns a particular instance of the sorted database (11) of the core (111) (gamInit-<agtName>) a determined value (METHBEGIN). If the core has not yet been initialized, only the reading pipes (pipeReqSnmp and pipeRespMeth) are created and opened in the function "methInit". In this case, an error is returned and the descriptors of the writing pipes (pipeRespSnmp and pipeReqMeth) are valuated at 0 (zero). When the core is initialized, the method is informed of this by the reception of an instance modification request (SET) that assigns the particular instance (gamInit-<agtName>.0) a given value (COREBEGIN). The method must then open the pipes "pipeRespSnmp" for writing in a non-inhibiting way. If the core has already been initialized, the sending of the message WRITEINST that sets the instance "gamInit-<agtName>.0 to METHBEGIN will initiate the MUTE mode. It is imperative that the function "methInit" be called by the method as soon as it is initiated.

MethEndInit (direct interface mode)

Name methEndInit

Parameters const char*gamAgtDir const char*pipesDir const char*agtName const long pipeReqMeth Description The function "methEndInit" that determines the end of the initialization of the method, as well as the end of the initialization of the core of the agent when the latter is initialized by the method, comprises the above parameters. The developer must indicate the directory "gamAgtDir" of the core of the agent, the directory "pipesDir" of the pipes used by the agent, and the name of the agent "agtName". If the core (111) has not yet been initialized, an error GAM is returned to the manager. If the core has already been initialized, the initialization function "methEndInit" sends the core of the agent a message of the instance writing type (WRITEINST) that assigns the particular instance of the sorted data base (gamInit-<agtName>.0) a given value (METHEND), which initiates the MUTE mode. The initialization function "methEndInit" must be called by the method at the end of its initiation and, in the case where the core of the agent is initialized by the method, at the end of the "writeInstDirect" sequence.

The function "initMerge" performs a merge between instance files.

InitMerge (for both modes)

Name initMerge

Parameters const char*gamAgtDir const char*instDir const char*tmpDir const char*agtName Description The developer must indicate the directory "gamAgtDir" of the core of the agent, the directory "instDir" in which the instance and incremental files are located, the name of the agent "agtName" and a temporary job directory "tmpDir". The function "initMerge" is inhibiting until a merged instance file is available. It is imperative that the function "initMerge" be called by the method, if the latter must be initialized in connection with the instance file.

To illustrate the various operations possible by means of a method, two examples of methods in the sockets interface mode are provided in appendices. In the first example in Appendix 1, the user enters as a parameter of this first method the name of the agent to which it must connect. After this connection, the method waits for messages from the core. Then, after twenty seconds, it modifies and reads the instances contained in the sorted databases of the core.

The second example in Appendix 2 makes it possible to illustrate the communication between two methods. It also illustrates the utilization of readnext to scan a table. This clearly shows the advantage of the cache memory constituted by the sorted databases of the core.

While this invention has been described in conjunction with specific embodiments thereof, it is evident that many alternatives, modifications and variations will be apparent to those skilled in the art. Accordingly, the preferred embodiments of the invention as set forth herein, are intended to be illustrative, not limiting. Various changes may be made without departing from the spirit and scope of the invention as set forth herein and defined in the claims.

APPENDIX 1

ANNEXE 1

```
/*
Product Name    :   OAT Agent - Method
File Name       :   method1_sock.c
Type            :   C source code file
Function        :   Sample for a method item of an OAT Agent
Author          :      Gérald SEDRATI
Copyright       :   BULL 1996
*/
#include     <gamApi/GAMAPI.h>
/* ---------------------------------------- */
/* Modify Section : Modify these 2 constants */
/* ---------------------------------------- */
/* Server name where the agent core is running */
#define SERVERNAME "ange"
/* Sockets TCP */
int sock_meth, sock_snmp;
/* Method identifier : WARNING the "confget" file HAS TO be configured */
#define METHID 1
/* ----------------------- */
/* End of Modify Section */
/* ----------------------- */
/* Name of the agent */
char agtName[MAXLENFILENAME];
/* Receive snmp messages from core agent */
```

APPENDIX 1-continued

```
static CVoidType snmpReceive(CIntfType sock)
{
    GAMMessType mess;
    GAMERROR("Message received from core\n");
    receiveSock(&mess, sock);
    if (mess.result != GAM_ERR_CORE_NOT_READY) {
        switch (mess.operation) {
            case GET:
                GAMERROR1("GET on %s\n", mess.inst);
                /* Special instance => value = <beep/ascii>*/
                if (!(strcmp(mess.inst, "pannelDescription.0"))) {
                    GAMERROR1("Special instance <%s>\n", mess.inst);
                    sprintf(mess.val, "character7:%c:fin", 0x7);
                    GAMERROR1("Value=%s\n", mess.val);
                    mess.result=OK;
                }
                /* For any other instance => value=1 */
                else {
                    strcpy(mess.val, "1");
                    GAMERROR1("Value=%s\n", mess.val);
                    mess.result=OK;
                }
                break;
            case SET:
                GAMERROR2("SET on %s=%s\n", mess.inst, mess.val);
                mess.result=OK;
                /* Special instance => set unable*/
                if (!(strcmp(mess.inst,"pannelVendor.0"))) {
                    mess.result=NOK;
                    GAMERROR1("Special instance <%s> NO SET\n",mess.inst);
                }
                break;
            case CREATE:
                GAMERROR2("CREATE on %s=%s REFUSED\n", mess.inst, mess.val);
                mess.result=NOK;
                break;
            case DELETE:
                GAMERROR1("DELETE on %s REFUSED\n", mess.val);
                mess.result=NOK;
                break;
            case SETLAST:
                GAMERROR2("LAST instance of a SET on %s=%s\n", mess.inst, mess.val);
                mess.result=OK;
                /* Special instance => set unable*/
                if (!(strcmp(mess.inst, "pannelVendor.0"))) {
                    mess.result=NOK;
                    GAMERROR1("Special instance <%s> NO SET\n", mess.inst);
                }
                break;
            case NOTIFY:
                GAMERROR1("Notify received from method id=%d...\n", mess.result);
                GAMERROR1("Message notified=%s\n", mess.val);
                /* Maybe your agent has something more to perform on notify...
                Write the code here */
                break;
        }
        if (mess.operation!=NOTIFY) {
            writeRespSock(mess, sock);
            if (mess.result == OK) {
                GAMERROR1("Response sent <%s>\n", mess.val);
            }
            else {
                GAMERROR("Response sent NOK \n");
            }
        }
    }
    else
    {
        GAMERROR("Core is down, exiting !...\n");
        exit(1);
```

APPENDIX 1-continued

```
      }
}
/* Main function : argv[1]=agent name (example : method1_sock miscagt)*/
void main(int argc,char **argv)
{
    GAMMessType mess;
    fd_set read_mask;
    struct timeval timeWait;
    GAMResultType result;
    CIntfType rc;
    /* Parsing arguments */
    if (argc!=2) {
        printGamError(GAM_ERR_ARG);
        printf("Usage : %s <agent_name>\n");
        printf("...Exiting !\n");
        exit(1);
    }
    strcpy(agtName, argv[1]);
    printf("Running GAM agent method item for %s\n", agtName);
    /* Initialization */
    result=connectSock(agtName, SERVERNAME, METHID, &sock_meth;
&sock_snmp);
    if (result) {
        printGamError(result);
        exit(result);
    }
    GAMERROR1("Method is connected to core of %s agent\n", agtName);
    /* Infinite loop : waiting 20 seconds for snmp message
    from core agent then sending writeInst, readInst and readNext */
    timeWait.tv_sec=20L;
    timeWait.tv_usec=0L;
    for(;;) {
        FD_ZERO(&read_mask);
        FD_SET(sock_snmp, &read_mask);
        rc=select(sock_snmp+1, &read_mask, (fd_set*)NULL,
(fd_set *)NULL,&timeWait);
        if (rc==0) {
            printf("Timeout of 20 seconds reached !\n");
strcpy(mess.inst, "panelVendor.0");
            sprintf(mess.val, "Random Manufacturer no %d", rand( ));
            result=writeInstSock(mess, sock_meth);
            printf("Write done\n");
            strcpy(mess.inst, "pannelId.0");
            result=readInstSock(&mess, sock_meth,2);
            if (result)
                printGamError(result);
            else
                printf("ReadInst :
inst=%s\tval=%s\n", mess.inst, mess.val);
            strcpy(mess.inst, "pannelVendor.-1");
            result=readNextSock(&mess, sock_meth,2);
            if (result)
                printGamError(result);
            else
                printf("ReadNext :
inst=%s\tval=%s\n", mess.inst, mess.val);
        }
        if (FD_ISSET(sock_snmp, &read_mask)) {
            snmpReceive(sock_snmp);
        }
    }
                }
```

APPENDIX 2

ANEXE 2

```
/*
Product Name  :   OAT Agent - Method
File Name     :   method2_sock.c
Type          :   C source code file
Function      :   Sample for a method item of an OAT Agent
Author        :     Gérald SEDRATI
Copyright     :   BULL 1996
*/
#include    <gamApi/GAMAPI.h>
```

APPENDIX 2-continued

```c
/* ---------------------------------------- */
/* Modify Section : Modify these 2 constants */
/* ---------------------------------------- */
/* Server name where the agent core is running */
#define SERVERNAME "ange"
/* Method identifier : WARNING the "confget" file HAS TO be configured */
#define METHID 2
/* ------------------------ */
/* End of Modify Section */
/* ------------------------ */
/* Name of the agent */
char agtName[MAXLENFILENAME];
/* Sockets TCP */
int sock_meth, sock_snmp;
/* Global variable to take modifications into account */
int modif=0;
/* When a get is received on the special instance, response is computed
depending on other attributes */
static CBoolType verifyGet(GAMMessType* messRequest)
{
    GAMMessType messEvent;
    CIntfType i;
    sprintf(messEvent.inst, "lightId.-1");
    for (i=0;lstrncmp(messEvent.inst, "lightId.", 8);i++) {
        readNextSock( &messEvent, sock_meth, 10);
        if (messEvent.result != OK)
            break;
    }
    if (messEvent.result == OK) {
        i--;
        GAMERROR1("Actually %d instances in lightTable\n", i);
        sprintf(messRequest->val, "%d", i);
        return(TRUE);
    }
    else {
        GAMERROR("No response : unable to read nb of instances in
lightTable \n");
        return(FALSE);
    }
}
/* Receive snmp messages from core agent */
static CVoidType snmpReceive(CIntfType sock)
{
    GAMMessType mess;
    GAMERROR("Message received from core\n");
    receiveSock(&mess, sock);
    if (mess.result!=GAM_ERR_CORE_NOT_READY) {
        switch (mess.operation) {
            case GET:
                GAMERROR1("GET on %s\n", mess.inst);
                /* Special instance => value has to be computed*/
                if (!strcmp(mess.inst, "lightsNum.0")) {
                    GAMERROR1("%s is a special instance,
must compute its value...\n",mess.inst);
                    if (verifyGet(&mess))
                        mess.result=OK;
                    else
                        mess.result=NOK;
                }
                /* For any other instance => value=1 */
                else {
                    strcpy(mess.val, "1");
                    GAMERROR1("Value=%s\n", mess.val);
                    mess.result=OK;
                }
                break;
            case SET:
                GAMERROR2("SET on %s=%s\n",
mess.inst,mess.val);
                mess.result=OK;
                /* Special instances => set unable*/
                if (!(strcmp(mess.inst, "lightsNum.0"))) {
                    mess.result=NOK;
                    GAMERROR1("Special instance <%s> NO
SET\n", mess.inst);
                }
                else
                    modif++;
                break;
```

APPENDIX 2-continued

```
            case CREATE:
                GAMERROR2("CREATE on %s=%s
ACCEPTED\n", mess.inst, mess.val);
                mess.result=OK;
                modif++;
                break;
            case DELETE:
                GAMERROR1("DELETE on %s ACCEPTED\n",
mess.val);
                mess.result=OK;
                modif++;
                break;
            case SETLAST:
                GAMERROR2("LAST instance of a SET on
%s=%s\n", mess.inst, mess.val);
                mess.result=OK;
                /* Special instance => set unable*/
                if (!(strcmp(mess.inst, "lightsNum.0"))) {
                    mess.result=NOK;
                    GAMERROR1("Special instance <%s> NO
SET\n", mess.inst);
                }
                else
                    modif++;
                break;
            case NOTIFY:
                GAMERROR1("Notify received from method
id=%d...\n", mess.result);
                GAMERROR1("Message notified=%s\n",mess.val);
                /* Maybe your agent has something more to perform
on
notify...
                Write the code here */
                break;
        }
        if (mess.operation!=NOTIFY) {
            writeRespSock(mess, sock);
            if (mess.result == OK) {
                GAMERROR1("Response sent <%s>\n", mess.val);
            }
            else {
                GAMERROR("Response sent NOK\n");
            }
        }
    }
    else
    {
        GAMERROR("Core is down, exiting !...\n");
        exit(1);
    }
}
}
/* Main function : argv[1]=agent name (example : method(1_sock miscagft)*/
void main(int argc,char **argv)
{
    fd_set read_mask;
    struct timeval timeWait;
    GAMResultType result;
    CIntfType rc;
    /* Parsing arguments */
    if (argc!=2) {
        printGamError(GAM_ERR_ARG);
        printf("Usage : %s <agent_name>\n");
        printf("...Exiting !\n");
        exit(1);
    }
    strcpy(agtName, argv[1]);
    printf("Running GAM agent method item for %s\n", agtName);
    /* Initialization */
    result=connectSock(agtName, SERVERNAME, METHID, &sock_meth,
&sock_snmp);
    if (result) {
        printGamError(result);
        exit(result);
    }
    GAMERROR1("Method is connected to core of %s agent\n", agtName);
    /* Infinite loop : waiting 20 seconds for snmp message
    from core agent then notify method 1 if there is a change */
    timeWait.tv_sec=20L;
    timeWait.tv_usec=0L;
```

APPENDIX 2-continued

```
    for (;;) {
        FD_ZERO(&read_mask);
        FD_SET(sock_snmp, &read_mask);
        rc=select(sock_snmp+1, &read_mask, (fd_set *)NULL,
(fd_set *)NULL, &timeWait);
        if (rc==0) {
            printf("Timeout of 20 seconds reached !\n");
            if (modif) {
                result=notifyMeth("There are some changes in
lightTable",sock_meth,agtName,4,5);
                GAMERROR1("Notify transmitting result=%d\n",
result);
                modif=0;
            }
        }
        if (FD_ISSET(sock_snmp, &read_mask)) {
            snmpReceive(sock_snmp);
        }
    }
}
}
```

What is claimed is:

1. An agent (10) for communication between a manager (20) and at least one resource (30) of a data processing system, wherein the agent comprises a protocol core (111) created automatically from a formalized description of at least one resource (30), said core (111) comprising in compiled form a first interface (14) for communicating with the manager (20) and a model (11) of at least one resource (30) comprising values of instances of at least one resource (30), said values being accessible by the manager (20) through the first communication interface (14), wherein said agent additionally comprises a second interface (13) having at least one method (12) of access to at least one resource (30) for communicating with the protocol core (111) and updating and/or reading at least one value of an instance of the model (11) of the resource specific to the method (12), and for responding to requests from the core (111) related to the updating of at least one instance value of the model of the resource.

2. An agent (10) according to claim 1, wherein a resource is modeled in the form of attributes, and further including a configuration file (<agt.confget>) wherein access to each attribute managed by the agent can be obtained in either a "direct" mode or a "signal" mode, defined in the configuration file.

3. An agent (10) according to claim 2, wherein at least one access method includes sockets interface primitives, and the configuration file includes an identifier of the method associated with an instance value of the model of the resource.

4. An agent (10) according to claim 1, characterized in that the formalized description of the resource is in the form of an MIB (management information base), and the model (11) of the resource comprises a sorted database constructed from the formalized description of the resource.

5. An agent (10) according to claim 1, characterized in that the protocol core (111) includes a compiled file containing sorted data (115) for the management of objects specific to its operation.

6. An agent (10) according to claim 1, further including means for communication between the manager and the protocol core in accordance with a Simple Network Management Protocol (SNMP) ASN1 (Abstract Syntax Notation One), by means of verbs that allow the operations for reading an instance (GET), for reading a next instance (GET-NEXT) and for modifying an instance (SET).

7. An agent (10) according to claim 1, further including means for communication between the method (12) and the core (111) through online TCP/IP communication software.

8. An agent (10) according to claim 1, wherein the communication between the protocol core (111) and at least one method (12) of access to at least one resource (30) is in a "sockets" mode through two TCP/IP connection processes and sockets executable primitives by which the two TCP/IP connection processes communicate for performing the operations for reading the value of an instance (readInstStock), for modifying an instance (writeInstSock), for reading the next instance (readNextStock), for writing a new instance, and for deleting an instance.

9. An agent (10) according to claim 1, further comprising a function (notifymeth) for establishing communication between two methods (12) of access to the resource (30) in the "sockets" mode.

10. An agent (10) according to claim 1 further including named pages and executable primitives for communication between the protocol core or and at least one method for accessing at least one resource in a "direct" mode, thereby making it possible to perform the operations for reading the value of an instance (readInstDirect), for modifying an instance (writeInstDirect), for reading the next instance (readNextDirect), for writing a new instance, and for deleting an instance.

11. An agent (10) according to claim 1, characterized in that the structure of each message related to an operation on an instance of the resource, and constructed by the protocol core (111) of the agent to be sent to at least one method (12), comprises a field for identifying the instance, a field corresponding to the value of the instance, a code identifying the operation to be executed and a return code indicating whether the operation has been performed.

12. An agent (10) according to claim 1, characterized in that the manager (20) and/or each method (12) is constructed and arranged to create an instance in the model (11) of the resource managed by the core, by means of a request sent to the core (111) containing the verb (SET) for an instance modification on an instance that is nonexistent in the model, the reception of this request by the core (111) resulting in the creation of the instance.

13. An agent (10) according to claim 1, characterized in that the manager (20) and/or each method (12) is constructed and arranged to delete an instance in the model of a resource managed by the core (111) by a request comprising the verb (SET) for modifying an instance, which assigns the name of the instance to be deleted to a predetermined, preexisting instance (gamDeleteObject) of the model (110) of the resource (30), the reception of this request by the core (111) resulting in the deletion of the instance.

14. An agent (10) according to claim 1, characterized in that the model (11) of the resource (30) included in the core (111) is a database sorted in the lexicographical order of the protocol SNMP.

15. An agent (10) according to claim 1, characterized in that the model (110 of the resource managed by the core (111) is initialized by an instance file (40) created by a user before the initialization of the protocol core (111).

16. An agent (10) according to claim 15, further including a backup file (50) for storing the successive modifications of at least one instance value of the model of the resource said backup file (50) being of predetermined maximum size.

17. An agent (10) according to claim 16, characterized in that the values of the instances recorded in the backup file (50) are accessible by a user before the merge with the instance file (40).

18. An agent (10) for communication between a manager (20) and at least one resource (30) of a data processing system, wherein the agent comprises a protocol core (111) created automatically from a formalized description of at least one resource (30), said core (111) comprising in compiled form a first interface (14) for communicating with the manager (20) and a model (11) of at least one resource (30) comprising values of instances of at least one resource (30), said values being accessible by the manager (20) through the first communication interface (14), wherein the manager is constructed and arranged such that when the manager sends, in the same request, an operation for a modification (SET) on a list of instances, the core (111) transmits instance modification messages (SET) one by one to the methods (12) corresponding to each instance, the last message for modifying the last instance being transmitted by a modification message (SET LAST) indicating that it is the last instance in the list; as long as the method (12) has not received the last message from the core (111), the modifications of the instance are stored without being validated, and as soon as the last message (SET LAST) is received by the method (12), if all the modifications of the instances are possible, they are all validated, whereas if not, they are all canceled.

19. An agent for communication between a manager (20) and at least one resource (30) of a data processing system, characterized in that the agent comprises a protocol core (111) created automatically from a formalized description of at least one resource (30), said core (111) comprising in compiled form a first interface (14) for communicating with the manager (20) and a model (11) of the resource (30) comprising values of instances of the at least one resource (30), said values being accessible by the manager (20) through the first communication interface (14), wherein the model (11) of the resource managed by the core (111) is initialized by an instance file (40) created by a user before the initialization of the protocol core (111), a backup file (50) for storing the successive modifications of at least one instance value of the model of at least one resource, said backup file (50) being of predetermined maximum size, further including means for merging the instance file (40) and the backup file (50) before the initialization of the protocol core (111), or when the backup file (50) has reached the predetermined maximum size, or when the user so desires in order to create a new instance file (42) containing the last values of the instances saved in the back-up file, and to create an empty backup file (50).

20. An agent (10) according to claim 19, wherein the resource includes a memory for copying the contents of the backup file and the instance file.

21. An agent for communication between a manager (20) and at least one resource (30) of a data processing system, characterized in that the agent comprises a protocol core (111) created automatically from a formalized description of at least one resource (30), said core (111) comprising in compiled form a first interface (14) for communicating with the manager (20) and a model (11) of the resource (30) comprising values of instances of the at least one resource (30), said values being accessible by the manager (20) through the first communication interface (14), wherein the model (11) of the resource managed by the core (111) is initialized by an instance file (40) created by a user before the initialization of the protocol core (111), a backup file (50) for storing the successive modifications of at least one instance value of the model of at least one resource, said backup file (50) being of predetermined maximum size, characterized in that each line of the backup file (50) corresponds to a modification, a deletion, a creation, or a writing of an instance, and the backup file comprises a field containing a name of the instance, a field containing a value of this instance, and a field containing an identification of the type of operation performed on this instance.

\* \* \* \* \*